US006961644B2

(12) United States Patent
Mercier et al.

(10) Patent No.: US 6,961,644 B2
(45) Date of Patent: Nov. 1, 2005

(54) DUAL HAPTIC VEHICLE CONTROL AND DISPLAY SYSTEM

(75) Inventors: Vincent Mercier, Clarkston, MI (US); Ronald William Stencel, Clarkston, MI (US); James Bruce Dulgerian, Troy, MI (US); Wilhelm Leichtfried, Sterling Heights, MI (US); Charles McDowell, Rochester Hills, MI (US); Stephen Mezzomo, Shelby, MI (US); Eric Strebel, Southfield, MI (US); Patrick Ludlow, Oxford, MI (US)

(73) Assignee: Alps Automotive, Inc., Auburn Hills, MI (US)

( * ) Notice: Subject to any disclaimer, the term of this patent is extended or adjusted under 35 U.S.C. 154(b) by 0 days.

(21) Appl. No.: 10/319,435

(22) Filed: Dec. 12, 2002

(65) Prior Publication Data

US 2004/0117084 A1 Jun. 17, 2004

(51) Int. Cl.[7] .................. G06F 19/00; G06F 3/033; B60K 37/00
(52) U.S. Cl. .................. 701/36; 701/1; 307/10.1; 345/184
(58) Field of Search .................. 701/1, 36; 307/9.1, 307/10.1; 345/157, 184, 160, 161, 163, 167

(56) References Cited

U.S. PATENT DOCUMENTS

| | | |
|---|---|---|
| 4,394,555 A | 7/1983 | Long et al. |
| 4,464,933 A | 8/1984 | Santis |
| D276,038 S | 10/1984 | Montgomery |
| 4,503,528 A | 3/1985 | Nojiri et al. |
| 4,518,836 A | 5/1985 | Wooldridge |
| 4,578,592 A | 3/1986 | Nakazawa et al. |
| 4,608,550 A | 8/1986 | Umebayashi et al. |

(Continued)

FOREIGN PATENT DOCUMENTS

| | | | |
|---|---|---|---|
| DE | 10039131 A1 | * | 4/2001 |
| JP | 2001-160336 | * | 6/2001 |
| WO | WO 02/102616 A2 | * | 12/2002 |

OTHER PUBLICATIONS

Robert Bosch–Press Release, "Top Features and High–Quality Design: The New Skyline Car Radios From Plaupunkt," Apr. 25, 2002.

www.automotive–review.com/cclass.htm, *2001 C–Class: Is There Such Thing as a Mercedes That's a Bargain*, Jul. 29, 2002.

(Continued)

*Primary Examiner*—Michael J. Zanelli
(74) *Attorney, Agent, or Firm*—Brinks Hofer Gilson & Lione

(57) ABSTRACT

A dual haptic system control system in a vehicle includes a first haptic controller disposed on a steering wheel of a vehicle and a second haptic controller disposed on a console separated from the steering wheel. The first haptic controller is a mini-haptic interface that controls a smaller set of functions than the second haptic controller. Redundancies are built in between the first and second haptic controllers so that at least some of the functions of the first haptic controller are also controlled by the second haptic controller. The steering wheel is devoid of stalk switches, with the first and second haptic controllers, in conjunction with switches and menu keys on the steering wheel controlling these functions. The display illustrates the functions that are operable from the present state of the system as buttons that contain both text (of the button function) and graphics (of the button function and any sub-functions available).

57 Claims, 22 Drawing Sheets

U.S. PATENT DOCUMENTS

| | | |
|---|---|---|
| 4,616,224 A | 10/1986 | Reighard |
| 4,628,310 A | 12/1986 | Reighard et al. |
| 4,635,029 A | 1/1987 | Yamada |
| 4,684,918 A | 8/1987 | Solomon |
| 4,698,838 A | 10/1987 | Ishikawa et al. |
| 4,792,783 A | 12/1988 | Burgees et al. |
| 5,085,461 A | 2/1992 | Shibata |
| D342,474 S | 12/1993 | Oki |
| D346,997 S | 5/1994 | Kurtis |
| D347,612 S | 6/1994 | Allen |
| 5,403,981 A | 4/1995 | Chen et al. |
| 5,438,314 A | 8/1995 | Evans |
| 5,469,338 A | 11/1995 | Sims |
| 5,542,694 A | 8/1996 | Davis |
| 5,569,893 A | 10/1996 | Seymour |
| 5,666,102 A | 9/1997 | Lahiff |
| 5,721,541 A | 2/1998 | Repp et al. |
| 5,739,491 A | 4/1998 | Crosson, Jr. |
| 5,756,950 A | 5/1998 | De Filippo |
| 5,767,466 A | 6/1998 | Durrani |
| 5,823,666 A | 10/1998 | Kingsolver |
| 5,833,025 A | 11/1998 | Bhandari |
| 5,855,144 A | 1/1999 | Parada |
| 5,872,511 A | 2/1999 | Ohkuma |
| D406,805 S | 3/1999 | Sacco et al. |
| D410,606 S | 6/1999 | Sacco et al. |
| 5,955,944 A | 9/1999 | Donner |
| D418,786 S | 1/2000 | Giamos |
| D419,507 S | 1/2000 | Triarsi et al. |
| D421,945 S | 3/2000 | Sacco et al. |
| 6,034,600 A | 3/2000 | Browne et al. |
| 6,040,542 A | 3/2000 | Wolfe |
| D424,000 S | 5/2000 | An et al. |
| D424,488 S | 5/2000 | Thorpe |
| 6,144,297 A | 11/2000 | Donner |
| D438,151 S | 2/2001 | Pfeiffer |
| D440,914 S | 4/2001 | Pfeiffer |
| 6,225,578 B1 | 5/2001 | Kobayashi et al. |
| 6,240,347 B1 | 5/2001 | Everhart et al. |
| 6,253,131 B1 | 6/2001 | Quigley et al. |
| 6,349,616 B1 | 2/2002 | Onodera et al. |
| D454,101 S | 3/2002 | Pfeiffer et al. |
| 6,360,149 B1 | 3/2002 | Kwon et al. |
| 6,373,472 B1 | 4/2002 | Palalau et al. |
| 6,389,332 B1 | 5/2002 | Hess et al. |
| 6,411,934 B1 | 6/2002 | Möller et al. |
| D460,031 S | 7/2002 | Montijo |
| 6,418,362 B1 | 7/2002 | St. Pierre et al. |
| 6,424,337 B1 * | 7/2002 | Eriksson et al. ............ 345/163 |
| 6,571,154 B2 * | 5/2003 | Worrell et al. ................ 701/1 |
| 6,703,999 B1 * | 3/2004 | Iwanami et al. ............ 345/158 |
| 2001/0043047 A1 | 11/2001 | Klug et al. |
| 2001/0052694 A1 | 12/2001 | Schutz |
| 2002/0033321 A1 | 3/2002 | Miyako et al. |
| 2002/0054060 A1 | 5/2002 | Schena |
| 2002/0057150 A1 | 5/2002 | Hayashi et al. |
| 2002/0091473 A1 | 7/2002 | Gardner et al. |
| 2002/0116156 A1 | 8/2002 | Remboski et al. |
| 2002/0120371 A1 | 8/2002 | Leivian et al. |
| 2002/0120374 A1 | 8/2002 | Douros et al. |
| 2004/0102881 A1 * | 5/2004 | Wampler et al. ............. 701/36 |

OTHER PUBLICATIONS wysiwyg://138/http://autos.excite.com/Edmunds/ view/id/13 335.html, *2001 Volkswagen Golf*, Jul. 29, 2002.

http://www.katalavox.com/kempfhandco.htm, *The Kempf Hand–Control System*, Jul. 29, 2002.

http://www.bmwworld.com/models/concepts/z22.htm, *The "Mechatronic" car*, Jul. 29, 2002.

wysiwyg://18/http://www.vwtexas.com/vw_service/Steering_Wheel.asp, *Multi–Function Steering Wheel*, Jul. 29, 2003.

http://www.vwvortex.com/news/07_00/07_14/index.shtml, *Volksvagen 2001 Model Year Changes*, Jul. 29, 2002.

\* cited by examiner

DUAL HAPTIC VEHICLE CONTROL AND DISPLAY SYSTEM

BACKGROUND

Until recently, the relatively few functions that existed in vehicles were controlled by a few individual components. For example, windows were activated by switches on the door of the driver, radio controls were present on the dashboard located between the driver and passenger, and windshield wipers, lights, and turn signals were controlled by stalk switches present on the steering column. As the various types of control associated with this equipment increased, for example, individual timing settings for windshield wipers, stalk switches were added and refined to incorporate these multiple controls. However, the added cost and complexity of increasing both the number of stalk switches, positioning the stalk switches to allow operator access and visibility of the dashboard indicators, as well as the complexity of the wiring for those stalk switches and the limited space in the steering column as the amount of vehicle equipment increased, eliminated the possibility of further useful alterations in the stalk switches.

To solve the problem of controlling multiple pieces of equipment without increasing the number of stalk switches, knobs were added to the dashboard between the driver and passenger and buttons were added to the steering wheel itself. Some of the functions controlled by buttons on the steering wheel include radio and CD functions, volume control, and cruise control. Unfortunately, as the number of controls and complexity of the controls in vehicles has further increased, the number and complexity of various buttons and switches has become extremely cumbersome and in fact prohibitive. The sheer amount of information available to the driver and equipment to be controlled by the driver no longer merely includes the above controls but includes for instance vehicle characteristics (such as gas mileage), temperature controls, multiple zones of comfort that need to be set, DVD controls, controls for cellular telephones, controls for GPS systems, controls for wireless email. The further addition of buttons, knobs, or switches would add to the already confusing jumble of controllers that exist and serve to further distract the driver from paying attention to the road.

One solution to controlling the increasing amount of equipment is through the use of haptic interfaces. Haptic interfaces are devices that allow a user to interact with a computer by receiving tactile feedback. Usually feedback to the operator is provided by generating a force that the user can sense by feel. This force can either be constant or have different modes dependent on the operating conditions and particular computer program running. With the recent decreasing cost of such devices, the haptic interface has been incorporated into many new applications. Some of these devices include glove-type devices, pen-type devices or mouse-type devices, which may serve to allow users to touch and manipulate 3-dimensional virtual objects, feel textures of 2-dimensional objects, operate machinery remotely in hazardous environments, or in various simulations. In the last case, with the rapid increase in computing power and decrease in cost, haptic control is now readily available to enhance realistic conditions for numerous types of simulations, for example video games such as car driving games.

However, there has been more limited application of haptic interfaces to vehicles. This is because, unlike video game controllers which may be designed specifically for simulation and haptic control, vehicles have limitations of cost and space that make use of haptic controllers either unaffordable or unmarketable for the advantage they provide. Or these limitations used to render the use of haptic interfaces simply unusable in vehicles. Furthermore, unlike video game controllers in which buttons are constantly being activated, steering wheel twisted, or lever manipulated and violent feedback constantly required, vehicle controls do not require this sort of motion. Nor is this type of motion preferable for controlling functions in a vehicle, in which the controlling equipment may be critical for safety purposes and such motions are likely to at least distract the driver.

At present, a haptic interface has only been installed in a luxury vehicle. This haptic interface has been used to control some of the extra functions that have been added or controlled by the various buttons and knobs on the steering wheel/on the dashboard and eliminated these controllers. However, present haptic interfaces are difficult to learn and use as the number of menu options are extensive and irregularly displayed on the display. In general, only text is shown and there is limited display graphics. Furthermore, there are multiple nested screens with little, if any, indication of how to get from one screen to another. In addition, there are few degrees of freedom for the controller within each screen. This means that until the driver memorizes the overall system, the driver is likely to have to study the display to determine which function he or she has activated and decide how he or she must further manipulate the controller to achieve the desired result. In addition, even if the driver is competent, if the driver makes a mistake, it is difficult to return to the screen to control the desired function. Furthermore, a multitude of buttons, knobs, and stalk switches, still remain, creating confusion as to what mechanism controls which function.

SUMMARY

It is an object of the present invention to solve the above mentioned problems and establish a user-friendly haptic interface that is quick and reliable to use. In addition, as stalk switches are relatively bulky and the elimination of the stalk switches (and their various electrical wiring requirements) would result in an increase to the useable space of the steering column or reduction in steering column diameter, it is an object to provide a steering wheel in which the steering column is devoid of stalk switches. Further, another object of the present invention to provide redundant mechanisms to decrease the possibility of driver error in manipulation and control of the various vehicle functions. Also, it is another object of the present invention to provide a display or graphical interface that displays interaction requirements between the operator and the haptic controller in an intuitive fashion. This gives the operator a series of options in an easily recognizable format on the display, represented as simulated mechanical controls of arranged in a logical sequence.

To these ends, as well as others discussed below, one embodiment of the dual haptic control system comprises a first haptic controller disposed on a steering wheel of a vehicle and a second haptic controller disposed on a console separated from the steering wheel.

The first and second haptic controllers may control overlapping functions or the functions controlled may be separate. The first haptic controller may be a mini-haptic controller that controls fewer functions of the vehicle than the second haptic controller control. Only a portion of the steering wheel related to the first haptic controller may provide tactile feedback.

Menu keys may exist on the steering wheel or hotkeys on the console. The menu keys and hotkeys direct control of the first or second haptic controller to a desired function to be controlled. The menu keys and hot keys may be disposed adjacent to the first or second haptic controller, respectively. Switches may additionally be disposed on the steering wheel, the combination of switches replacing all stalk switches on a steering column connected with the steering wheel. The switches on the steering wheel may be arranged in a logically consistent format such that groups of switches having related functions are grouped together. The switches may control functions of the vehicle not controlled by either of the first and second haptic controllers. The first haptic controller may comprise a haptic wheel interface having functions selected through rotation and activated through depressing the wheel interface.

A display that displays results of interaction between a user and any of the first and second haptic controllers and first and second hotkeys may be present. The display may display interaction options between the user and the second haptic controller as simulated mechanical controls of functions available to the user in a present state of the haptic control system and operations of the second haptic controller to control the functions available to the user in the present state. These simulated mechanical controls may be buttons which each contain an operation to control a particular function or a sub-function of the particular button. The buttons may contain both text and graphics, the text indicating the particular function of the particular button and the graphics illustrating an appropriate symbol indicating the particular function of the particular button, sub-functions of the particular function, or the operation to control the particular function or sub-function. Further, information of settings of functions of the haptic control system other than the functions available in the present state may be displayed outside the buttons. Tactile feedback may be provided for operation of the second haptic controller consistent with the operation to control the particular function or sub-function when the particular button has been selected by the user.

In addition, a voice redundancy mechanism that provides voice redundancy for limited functions controlled by the first and second haptic controllers may be present.

In another embodiment, the vehicle haptic control system comprises a first haptic controller and a first set of hotkeys that are disposed on the steering wheel, with the first set of hotkeys directing control of the first haptic controller, and a second haptic controller that is disposed on a console separate from the steering wheel.

The first haptic controller may comprise a haptic wheel interface having functions selected through rotation and activated through depressing the wheel interface.

In another embodiment of the present invention, a method of controlling functions of a vehicle comprises providing haptic control on a steering wheel of the vehicle and controlling a first set of the functions of the vehicle using the haptic control on the steering wheel, providing separate haptic control on a console of the vehicle and controlling a second set of the functions of the vehicle using the haptic control on the console, and eliminating stalk switches on a steering column of the vehicle.

The method may comprise establishing control of at least some of the same functions between the haptic controls on the steering wheel and the console. In addition, the method may comprise limiting the first set of functions to fewer functions than the second set of functions or duplicating all of the first set of functions in the second set of functions.

The method may comprise establishing tactile feedback on only a portion of the steering wheel. The method may comprise enabling display of results of use of either haptic control or providing voice redundancy for limited functions controlled by the haptic controls.

The method may comprise establishing direct control of the haptic control on the steering wheel to a desired function to be controlled through a first set of hotkeys on the steering wheel. In addition, the method may comprise arranging the first set of hotkeys to be adjacent to the haptic control on the steering wheel or arranging a second set of hotkeys to be adjacent to the haptic control on the console. In the latter case, the method may additionally comprise establishing direct control of the haptic controls to functions to be controlled through the respective set of hotkeys and further yet comprise enabling display of the results of use of any of the haptic controls and set of hotkeys.

The method may comprise replacing functions of the stalk switches by functions controlled by switches on the steering wheel, the haptic control on the steering wheel, and first set of hotkeys. Also, the method may comprise reducing a number of buttons on the steering wheel by replacing a set of buttons on the steering wheel with the haptic control on the steering wheel or arranging switches on the steering wheel in a logically consistent format such that groups of switches having related functions are grouped together.

Other embodiments, a method and computer-readable medium that executes a procedure of supplying vehicle information for a vehicle on different screens comprises grouping the vehicle information into different systems of the vehicle, providing different sets of adjustable functions for the different systems, displaying each set of adjustable functions for a particular system on a representative screen for displaying the adjustable functions of a presently selected system, and pictorially representing the adjustable functions, pictorial representations of the adjustable functions containing one of interactive graphics and an interactive alphanumerical display that correspond to present states of the adjustable functions; selecting an adjustable function of the vehicle through manipulation of a haptic controller in the vehicle; controlling a present state of the selected adjustable function through manipulation of the haptic controller; and indicating the present state of the controlled adjustable function on the representative screen displaying the presently selected system.

The method/computer-readable medium may comprise incorporating textual information with the pictorial representations, the textual information supplied with each adjustable function indicating a name of the adjustable function.

The method/computer-readable medium may comprise displaying the adjustable functions as buttons and incorporating the pictorial representations in the buttons. The method may further comprise displaying available sub-functions of each adjustable function in the button corresponding to the adjustable function that include the available sub-functions. In addition, the method may further comprise displaying, in the button corresponding to the adjustable function, a method of controlling one of the adjustable function and a presently selected available sub-function of the adjustable function using the haptic controller. Also, the method may further comprise displaying, in the button corresponding to the adjustable function, textual information indicating the present state of the adjustable function.

The method/computer-readable medium may comprise highlighting a presently selected sub-function or outlining a presently selected button. The method may comprise displaying, outside the buttons, information other than that of the presently selected system.

The method/computer-readable medium may comprise allowing immediate control of a most often used function of a particular screen when the particular screen is accessed. The method may comprise supplying one of tactile and voice feedback to the operator indicating one of when a screen is entered and when one of a function and sub-function displayed is selected, when the one of the screen is entered and the one of the function and sub-function displayed is selected.

In another embodiment, a system that provides vehicle information to an occupant of a vehicle comprises: electronic components including a processor, memory, and video display circuitry, the processor grouping the vehicle information into different systems of the vehicle that have sets of adjustable functions; a display having a screen, the processor controlling the display to display each set of the adjustable functions for a particular system on a representative screen that displays the adjustable functions of a presently selected system and to supply pictorial representations of the adjustable functions, the pictorial representations containing one of interactive graphics and an interactive alphanumerical display that correspond to present states of the adjustable functions, the representative screens and pictorial representations stored in the memory; and inputs through which the adjustable functions are adjusted, the inputs including a haptic controller manipulated to select one of the adjustable functions and control a present state of the selected adjustable function. In this system, the electronic components receive signals from the inputs and transmit signals to the display indicating the present state of the controlled adjustable function on the representative screen displaying the presently selected system.

The processor may control the display to incorporate textual information with the pictorial representations, the textual information supplied with each adjustable function indicating a name of the adjustable function.

The processor may control the display to display the adjustable functions as buttons and incorporating the pictorial representations in the buttons. In this case, he processor may control the display to display available sub-functions of each adjustable function in the button corresponding to the adjustable function that include the available sub-functions. Further, the processor may control the display to display, in the button corresponding to the adjustable function, a system of controlling one of the adjustable function and a presently selected available sub-function of the adjustable function using the haptic controller. Alternatively, the processor may control the display to display, in the button corresponding to the adjustable function, textual information indicating the present state of the adjustable function and/or control the display to highlight a presently selected sub-function. The processor may control the display to outline a presently selected button and/or to display, outside the buttons, information other than that of the presently selected system.

The processor may allow immediate control of a most often used function of a particular screen when the particular screen is accessed.

The system may further comprise an audio system controlled by the processor, and the processor control signals to supply one of tactile and voice feedback to an operator of the haptic controller that indicates one of when a screen is entered and when one of a function and sub-function displayed is selected, when the one of the screen is entered and the one of the function and sub-function displayed is selected.

DETAILED DESCRIPTION OF THE PRESENTLY PREFERRED EMBODIMENTS

Presently, haptic controllers used in vehicles merely add to the confusing array of switches and levers available to control functions of the vehicle. In addition, existing haptic controllers display the effects of possible operations of the haptic controllers in a non-intuitive manner, adding to the chaos associated with controlling the vehicle and distracting the driver from driving by requiring him or her to search the display for extended periods of time to find the various function and operation desired. This is not only dangerous, but also limits the usefulness of the haptic controller to the point that there essentially exists no need to incorporate such an element in the overall vehicle control system.

The present invention incorporates a haptic interface that is reliable to use and easy to learn. Display of the functions available to the driver in the present state of the system is arranged in a logical and consistent format that is easily recognizable, as is display of any sub-functions available. Textual information is limited and pictorial information displayed to the operator in an intuitive manner such that an operator first learning the system as well as well those versed in the system can operate the system quickly, easily, and without having his or her attention drawn to the display for extended periods of time. Tactile feedback applied to the haptic controller and felt by the driver during operation of some of the functions and sub-functions increase the versatility of the system. Tactile feedback, as used herein, is more than merely a feeling provided to the user by the mechanical activation of a switch; a driving force is applied by a motor so that the user feels variations in the force dependent on the function being controlled by the haptic controller in that particular state. The tactile feedback is programmable. Further, redundant mechanisms, such as alternate haptic controllers that are located in a more convenient manner than the primary haptic controller or voice feedback for limited functions decrease the driver error in manipulation and control of the various vehicle functions in addition to increasing the safety of the vehicle's occupants. In addition, the overall system eliminates stalk switches as well as reduces the electrical wiring in the steering column associated with the stalk switches. The various functions being controlled or adjusted refer to operation of vehicle equipment, e.g. lights (flash to pass/beam change), windshield wipers, sound systems, climate control, as well as navigation, email and phone systems present in the vehicle.

Figure 1:
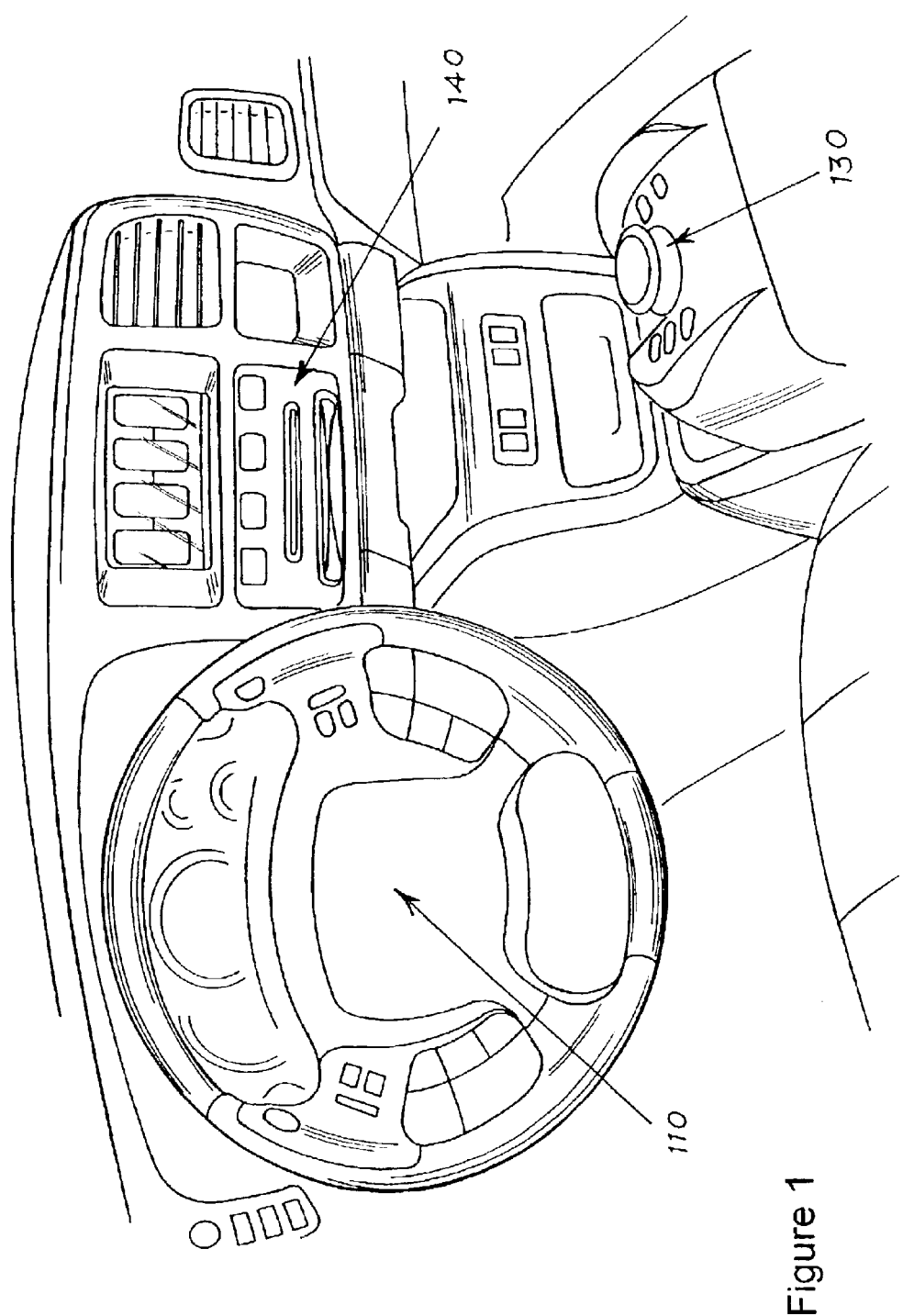
FIG. 1 illustrates an embodiment of the present invention.

One embodiment of the haptic system is shown in FIG. 1. As illustrated in FIG. 1, the haptic system includes a steering wheel 110, a primary haptic control 130, and a display/input section 140. Although it cannot be seen from the view shown of FIG. 1, the steering column in the steering wheel 110 does not contain any stalk switches. This also reduces the internal wiring in the steering column associated with and necessary for the stalk switches and thereby permits more room in the steering column for the power tilt and telescope, angle sensor and ignition system or permits the steering column to be decreased in diameter. The steering wheel 110, primary haptic control 130, and display/input section 140, as well as the various controllers and mechanisms associated with each of these are fabricated using materials well known in the art.

Figure 2:
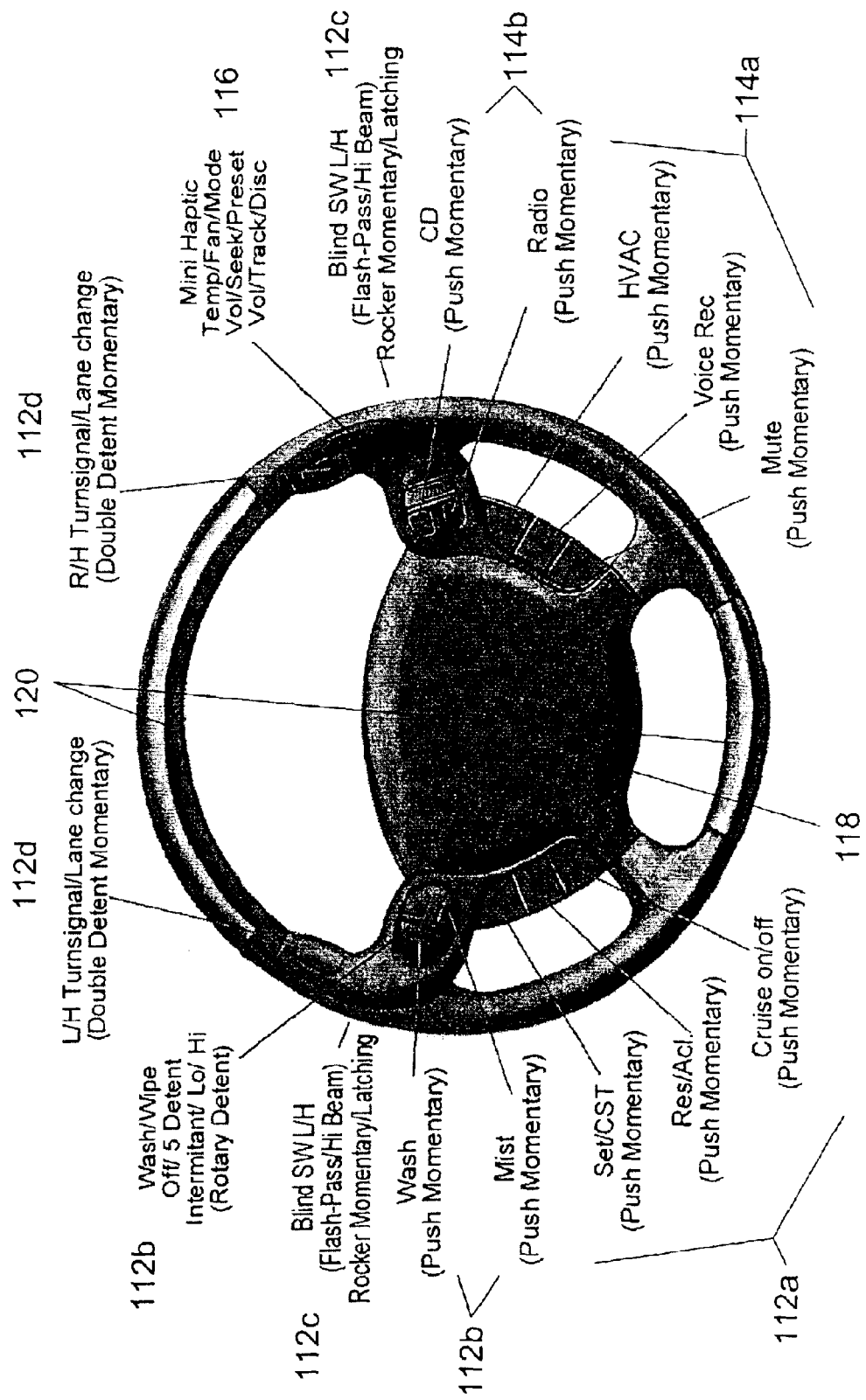
FIG. 2 shows an embodiment of a steering wheel of the present invention.

An enlarged illustration of the wheel is shown in FIG. 2. All of the functions contained in normal stalk switches such as various functions flash to pass/high beam, turn signals, or windshield wiper speed are now provided either by switches 112 on the steering wheel 110. Along with the switches 112 and the haptic controller 116, the steering wheel 110 is provided with menu keys 114, an air bag/horn 118, and colored portions 120. The air bag/horn 118 is a standard component located at the center of the steering wheel 110 and will not be further discussed here. Similarly, the materials used to fabricate the steering wheel 110 are well known in the art and will not be further discussed here. The combination of the switches 112 permits all of the stalk switches on the steering column to be eliminated.

The colored portions 120 make the steering wheel 110 more aesthetically pleasing. In addition, the colored portions 120 guide the driver to the desired switch or hotkey without requiring the driver to be distracted from the road through the driver's peripheral vision. The colored portions 120, of course, can be eliminated to make the steering wheel 110 a uniform color.

The switches 112 are disposed in multiple locations: around the center of the steering wheel 110, adjacent to the air bag 118, along the rim of the steering wheel 110, on the backside of the steering wheel 110, and along the spokes connecting the rim and the center of the steering wheel 110. There is no functionality overlap between the switches 112 and the haptic interface, that is, the switches 112 do not control the same functions as those controlled by various haptic controllers in the vehicle. One of the advantages of this is that the switches 112 control vehicle equipment that is necessary for operating the vehicle itself and establishing safety of the vehicle in different driving situations, i.e. flash to pass/high beam for night driving, windshield wipers for rainy conditions, cruise control and turn signals. Such equipment is not at the mercy of a passenger (through the main haptic controller), nor does the driver have to review a display to determine whether the correct piece of equipment or function is being activated or toggle through different menus to activate these function.

In addition, the switches 112 are divided into groups of switches 112a, 112b, 112c, 112d that are arranged in a logical manner to facilitate both initial education and later usage. The groups of switches have related functions; the first group of switches 112a adjacent to the center of the steering wheel 110 allow the driver to manipulate the cruise control, the second group of switches 112b on the spokes of the steering wheel 110 permit the driver to control the windshield wipers, the third group of switches 112c on the backside of the steering wheel 110 allow the driver to change to high beam and flash to pass, and the fourth group of switches 112d on the rim of the steering wheel 110 allow the driver to activate the turn signals. The various groups are arranged to be easily accessible by the driver. For example, the fourth group of switches 112d, which are likely to be accessed more than any other group, are disposed such that they can be actuated by the driver's thumbs when the driver is holding the wheel in the standard and safe 10 o'clock–2 o'clock position. Thus, to actuate the turn signals, the driver merely depresses the appropriate switch with the respective thumb and does not have to remove one of his or her hands from the wheel. This increases the safety of all occupants of the vehicle as the driver either does not have to remove his or her hands from the wheel to actuate or manipulate a stalk switch to control these functions or, in the case of turn signals or lights, even move his or her hands much. The cancellation of the turn signal is controlled by the angle sensor in the steering column. This device can also be programmed to turn off certain functions during rotation of the steering wheel to prevent inadvertent actuation.

The mini-haptic controller 116 is a wheel interface that increases the ability of the driver to control multiple vehicle functions with a reduced number of inputs. The wheel interface 116 is able to be both rotated and depressed to select a vehicle function in the infotainment area to be controlled. As an example, the CD menu key is pressed, thereby entering the CD main menu. The volume control is automatically selected. The wheel interface 116 may be depressed to select additional functions (Track, Mode) and then rotated to adjust that particular function. After selecting the Track function, the track number may be toggled through rotating the wheel interface 116.

Although multiple depressing and actuation could be performed to select different sub-functions, it is preferable that the wheel interface 116 have limited functionality (i.e. only one sub-function of a particular menu is able to be selected) due to not only size and location constraints but in addition ease of use. Alternatively, automatic selection is derived from each menu key 114. For example, by depressing the RADIO menu key the operator may adjust the volume automatically, by depressing the wheel other allowable functions within that menu are selected (PRESET, SEEK). This may be the same for the CD menu (whose functions are Volume, Track, and Mode) and the climate control (whose functions are Temp, Fan, and Mode).

The wheel interface 116 is a mini-haptic controller that controls only a few functions of the information system of the vehicle compared with the main haptic controller. One of the redundancies in the present invention is that all of the functions controlled by the mini-haptic controller are also controlled by the main haptic controller (in addition, a voice redundancy mechanism that tells the driver what function/sub-function is being selected or actuated is also preferably provided for limited functions controlled by the mini-haptic controller). This permits the driver to control the same functions at two different locations, whichever he or she prefers. It also permits the driver to access the most used functions quickly and easily, without having to remove his or her hands from the steering wheel or draw his or her attention from the road. In addition, if a passenger alters the music playing, the volume of the music, or the temperature, for example, in a manner that is displeasing to the driver via the main haptic controller, the driver does not have to fight with passenger for control of the main haptic controller.

Further, tactile feedback is provided on the steering wheel 110 to the haptic controller 116 only—not to the switches 112, menu keys 114 or overall steering wheel. The particular tactile feedback is dependent on the function or sub-function over which the driver is exercising control. The motor and related mechanisms (not shown) that supply the tactile feedback are housed in the steering column. The manner in which the motor and related mechanisms provide the tactile feedback is well known in the art. As a result of the small size of the haptic controller 116 as well as the limited functions controlled, only a small motor is required to supply the necessary tactile feedback. This enables the mini-haptic controller to be introduced to the steering wheel as well as the associated mechanical equipment necessary to provide the tactile feedback to be disposed in the steering column. Increasing the weight of the device to which tactile feedback is applied correspondingly increases the motor size to provide the necessary amount of feedback to enable the user to sense this feedback. The additional size of the mini-haptic system that contains the motor and associated mechanical equipment makes fitting the haptic system into the steering column problematic.

The steering wheel 110 also contains menu keys 114. Each menu key 114 permits the driver to access a particular function of the Infotaiment system that is associated with the menu key. Thus, the driver simply activates the menu key associated with that particular menu and then uses either the mini-haptic controller 116 or the main haptic controller 132 to access the desired sub-function from that state.

The menu keys 114 are separated from the switches 112 and are disposed far enough away from the switches 112 such that the driver experiences little (if any) confusion between which of the two is being actuated. The menu keys 114, like the switches, are divided up into sets of related functions; the first set of menu keys 114a permits the driver to select the sound transmission/climate control and the second set of menu keys 114b permits the driver to select the audio equipment (radio, CD). The first set of menu keys 114a is adjacent to the center of the steering wheel 110, arranged symmetrically with respect to the first group of switches 112a with respect to the dynamics of the steering wheel 110 (i.e. the centers of the first group of each are about 120° apart). The second set of menu keys 114b is adjacent to the mini-haptic controller 116, both of which are disposed on a spoke of the steering wheel 110 and arranged symmetrically with respect to the second group of switches 112b as above.

The switches 112 and menu keys 114 have illustrations or other demarcations that indicate with which function they are associated. The top surface of the switch/menu key may be solid and the illustrations present on the top surface. Alternately, the switch/menu key may have the illustration carved into the top surface and have an LED (or other similar backlight) provided under the top surface to enable the illustration to be visible to the driver.

Usually, the switches 112 and menu keys 114 are permanently attached so that if the vehicle is involved in an accident, these components do not become dislodged from the steering wheel to become projectiles. This is unlike the hotkeys in the center of the vehicle, which are preferably fabricated using substantially interchangeable buttons. However, the switches 112 and menu keys 114 can also be fabricated using substantially interchangeable buttons, that is, buttons of the same external size and shape for ease of assembly and utility in configuration. In this case, the housings into which the buttons are placed may be the same, but the underlying configuration of the button different such that each particular function has a specific button configuration. For example, each housing has four contacts and each button grounds different combinations of these contacts (16 possible configurations=16 buttons) to indicate to circuitry connected with the housing which button is present. The interchangeability of the hotkeys (and possibly menu keys and switches) permits free layout of these components and allows the operator to interchange the components based on personal preference. Alternately, of course, the housings into which the buttons are placed may have functions automatically associated with that particular housing such that the switches or menu keys are identical (except for the illustrations).

The steering wheel has LEDs or other comparable indicators for different indicators. These include indication that the cruise control is active, indication that the high beams are on, and the drive gear that the vehicle is in.

Figure 3:
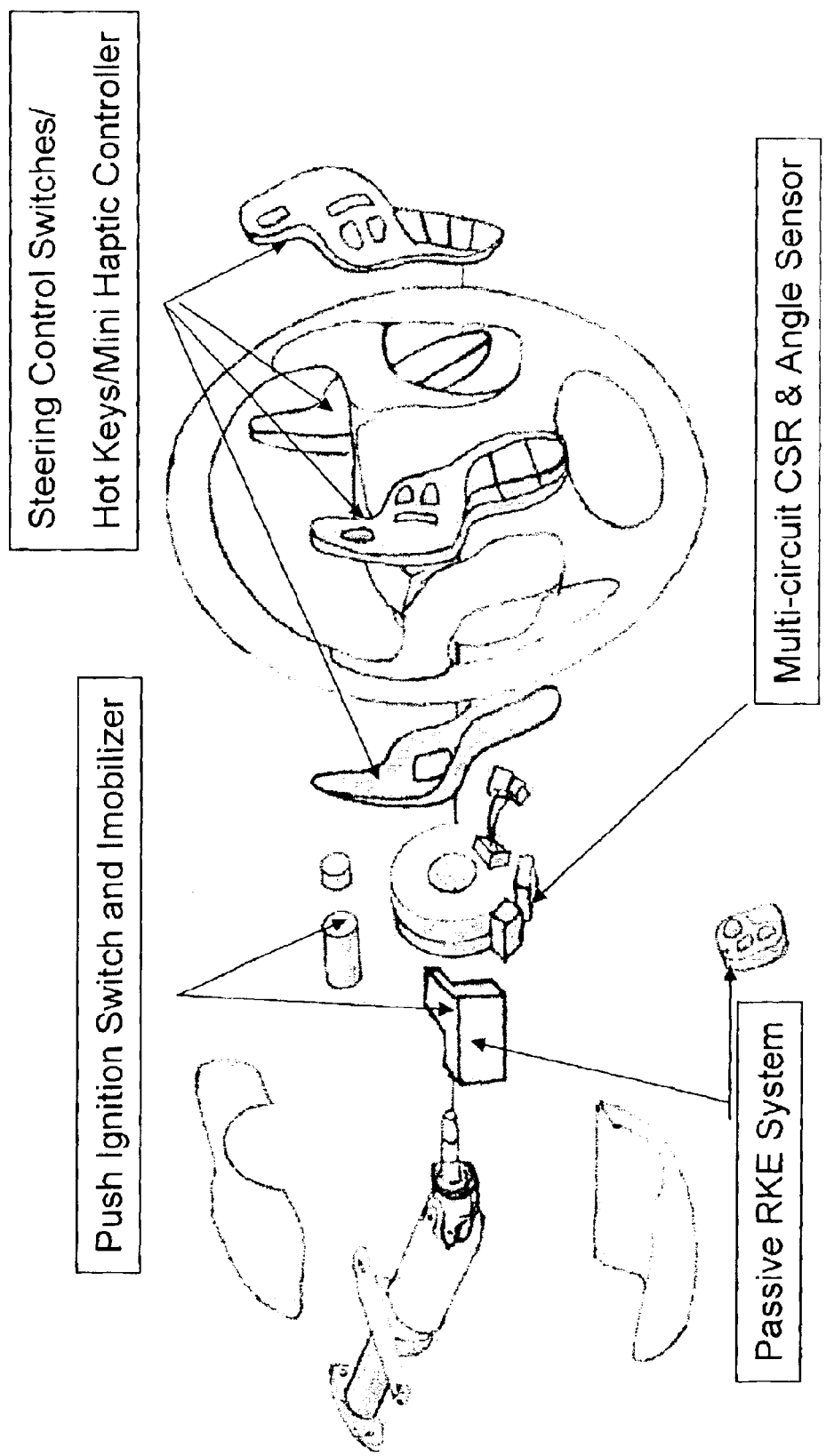
FIG. 3 shows an embodiment of a steering wheel and steering column of the present invention.

An embodiment of the steering wheel along with the steering column is shown in FIG. 3. The steering column is devoid of stalk switches and contains other components such as a passive RKE system. The steering column contains, for example, an angle sensor. The angle sensor determines the rotation angle of the steering wheel for control of, for instance, the steering system and anti-lock brake system.

Figure 4:
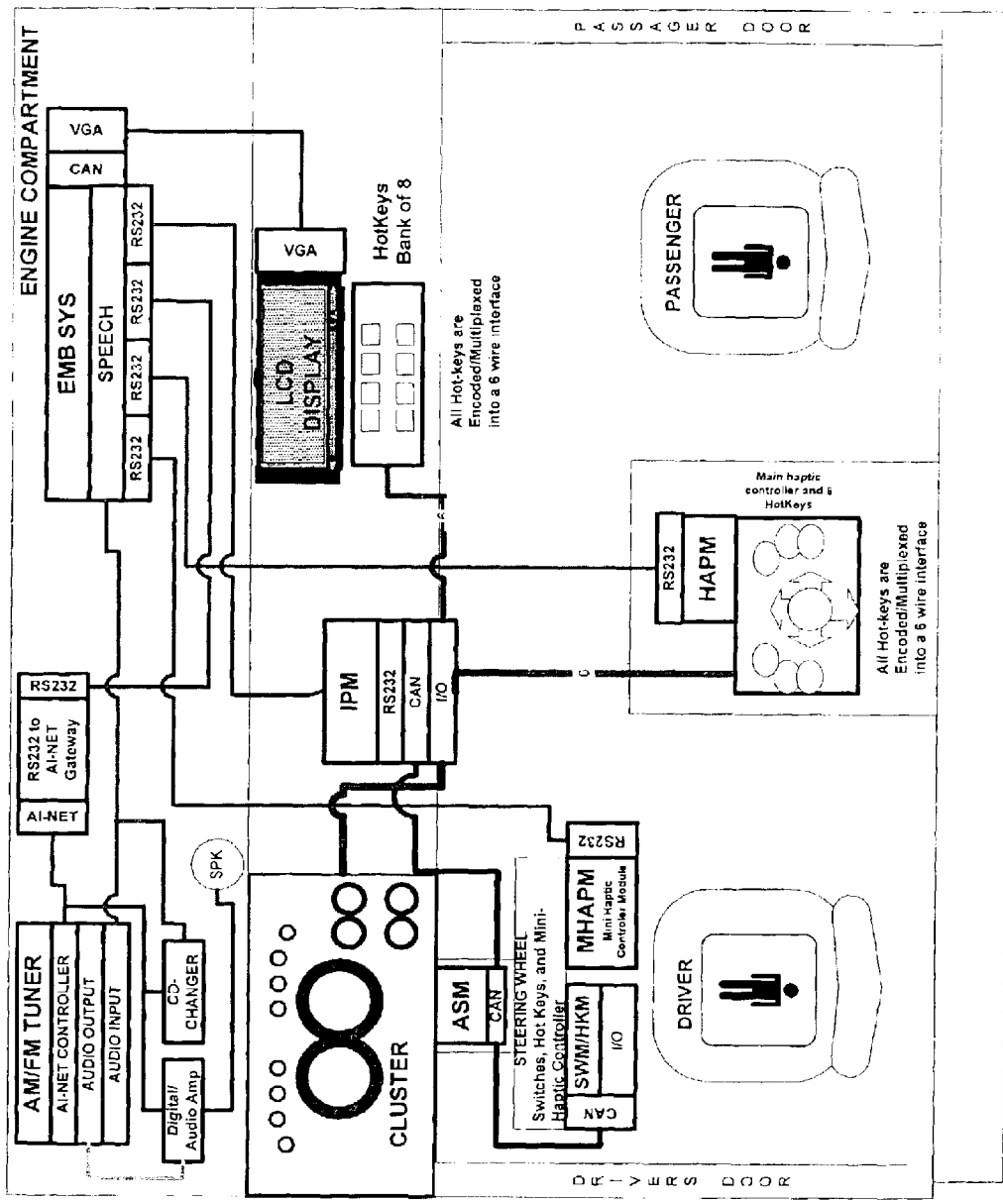
FIG. 4 shows an embodiment of the overall system of the present invention.

The underlying mechanical and electrical systems are depicted in FIG. 4. As shown in FIG. 4, the steering wheel contains switches and menu keys (SWM/HKM) as well as the mini-haptic controller (MHAPM). Signals are transmitted from the switches and menu keys along a CAN bus, which is designed to operate in noisy electrical environments with a minimum of data loss. The CAN bus also includes signals from the angle sensor module (ASM), which detects the rotation of the steering wheel and transmits signals to the appropriate mechanical devices to, for example, turn the wheels the correct amount. The information from the ASM and the steering wheel are transmitted along the CAN bus to an instrument panel module (IPM). The IPM controls appropriate equipment in an equipment cluster. In addition, signals from all sets of menu keys and hotkeys (on the wheel, on the console adjacent to the main haptic controller, and in the bank of hotkeys) are transmitted to the IPM. Signals are also transmitted from the IPM to an embedded system in the engine compartment via an RS232 or similar bus.

Figure 17:
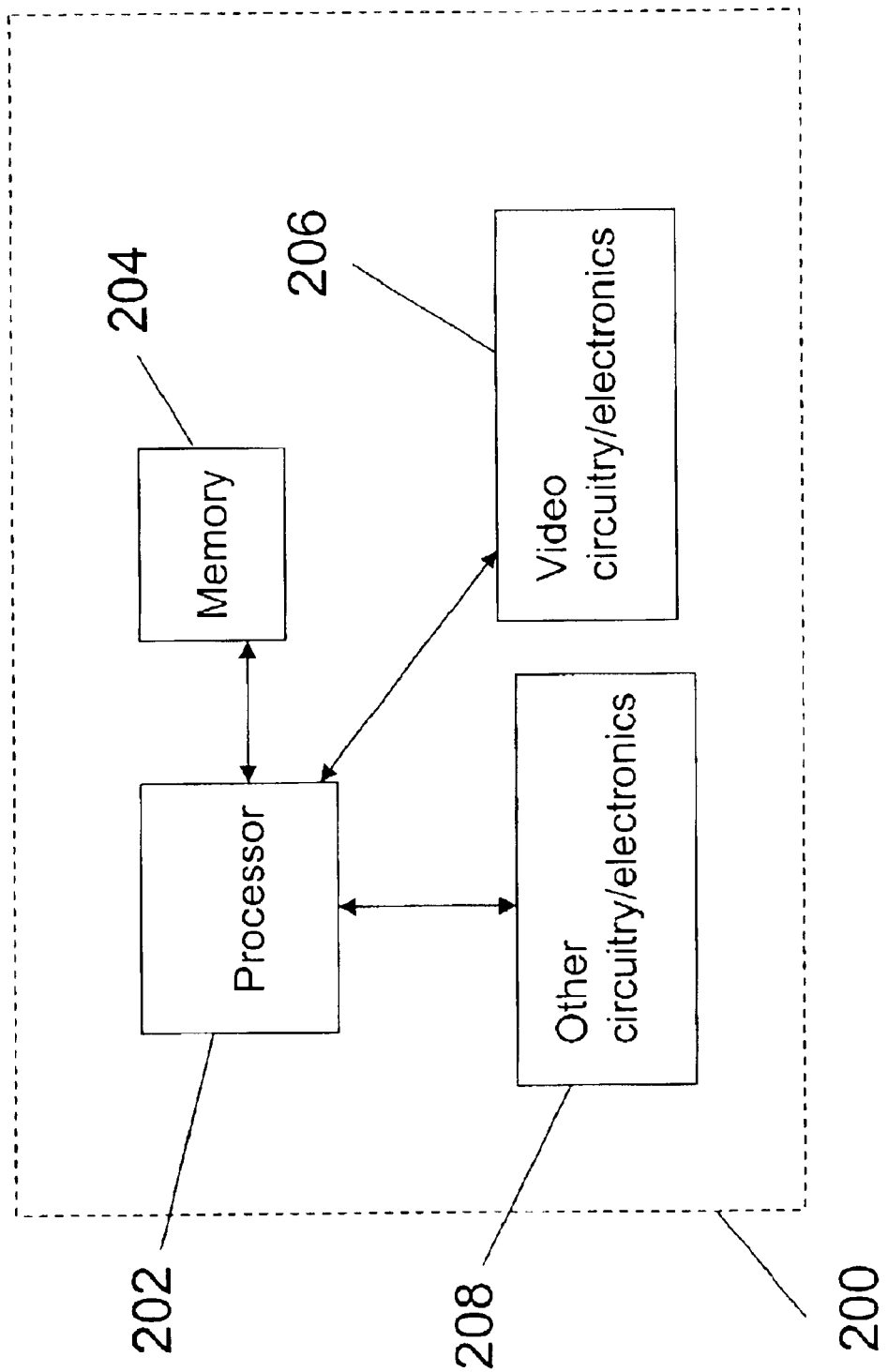
FIG. 17 shows an embodiment of the embedded system in an embodiment of the present invention.

The embedded system 200, as shown in FIG. 17, contains various electronic components including a processor 202, memory 204, and video card or similar circuitry/electronics 206 (as well as associated programming and display code and other necessary circuitry/electronics 208) to control the display and illustrate the appropriate screen and effects on that screen, such as motion of the outlining or highlighting or the interactive information. The embedded system transmits VGA signals that enable display of the appropriate screen to the LCD display, where the screens are displayed. The embedded system also contains a speech processor and/or recognition system whose output is connected with an audio input of the audio system. As shown, the RS232 bus connects both haptic controllers, the email/phonemail network (and gateway and controller), and the audio system with the embedded system. This permits the embedded system and computer control to communicate with, and if necessary, control these systems. The multiple signals are multiplexed and transmitted along an interface having a limited number of wires, thereby reducing the overall wiring requirements of the system.

The audio system includes an AM/FM tuner and audio output. The audio output and a CD module (changer) are connected with a digital audio amplifier and the resulting amplified signal is transmitted to the speaker system. The speaker system usually has a number of speakers (usually 2–8) located in various locations in the vehicle.

Other electronics as well as the actual computer system necessary to create the haptic control system and that allows the haptic control system control the vehicle equipment, are not depicted. In addition, although an RS232 bus, among others, is shown, other communication systems may be used, depending on the design specifications of the particular vehicle.

Figure 5:
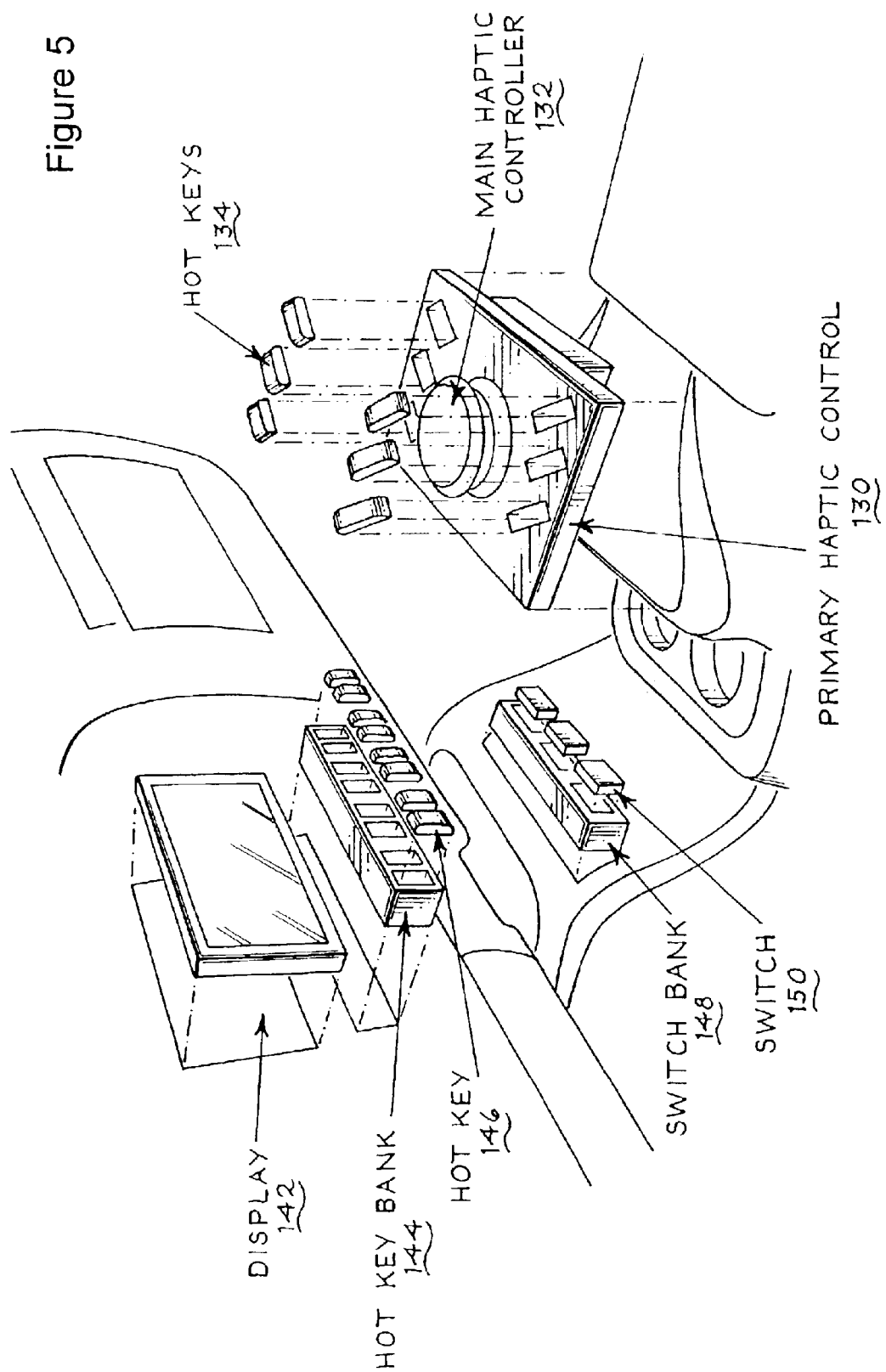
FIG. 5 shows an embodiment of the main haptic controller and display of the present invention.
Figure 6:
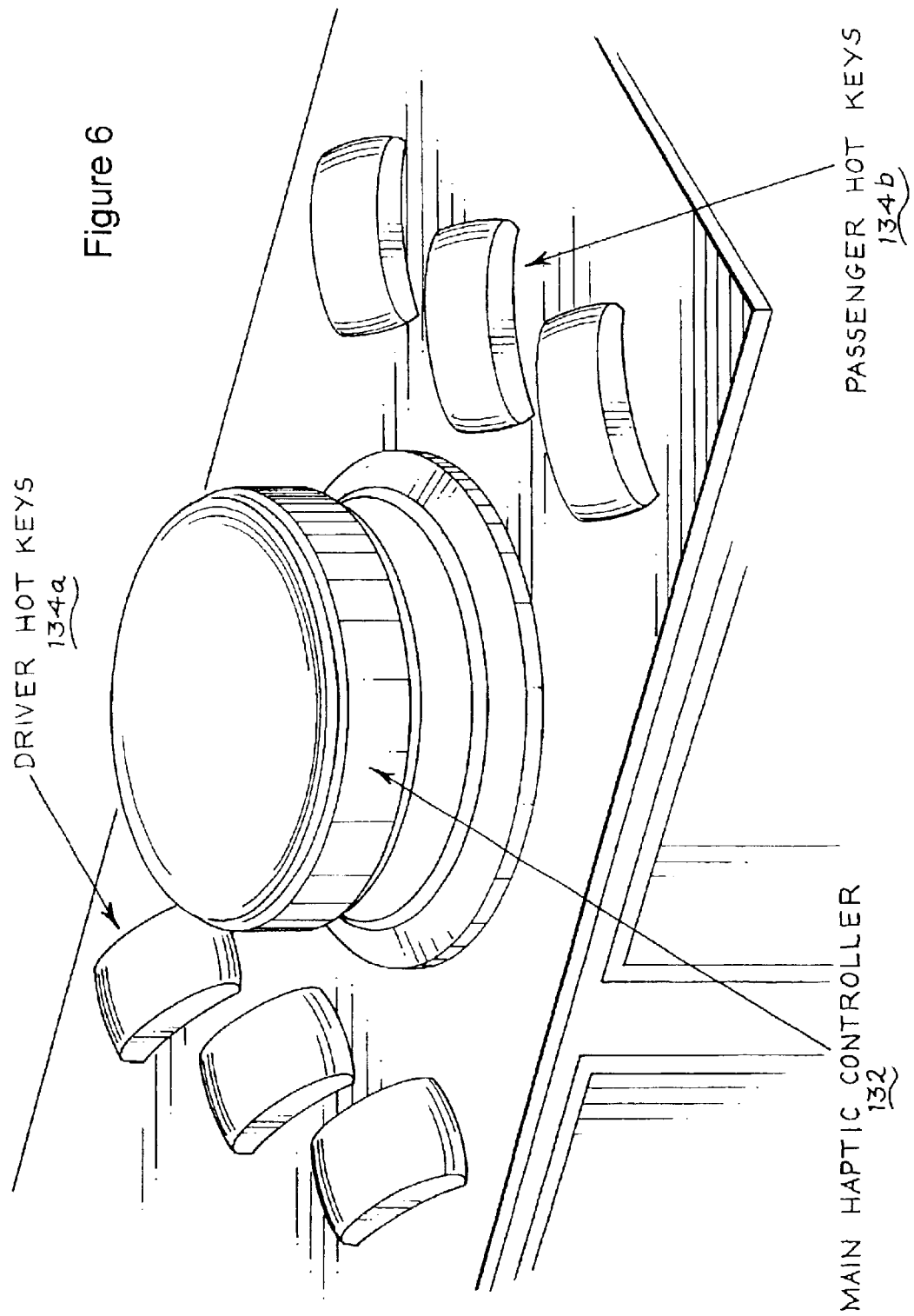
FIG. 6 is a close-up of an embodiment of the primary haptic control of the present invention.

Turning to the remainder of the system, as shown in FIG. 5, the primary haptic control 130 contains the main haptic controller 132 and a set of hotkeys 134 adjacent to the main haptic controller 132 and the display/input section 140 contains a display 142, a hotkey bank 144 that contains hotkeys 146 and is disposed adjacent to the display 142 and a switch bank 148 that contains switches 150 and is disposed between the display 142 and the primary haptic control 130. Another close up view of the main haptic controller 132 and hotkeys 134 adjacent to the main haptic controller 132 is shown in FIG. 6. The CD/DVD input below the hotkey bank 144 is not shown. In addition, a multiple CD/DVD player (not shown) may be stored with the vehicle and accessed through the haptic control system, for example, in the trunk of the vehicle.

The switch bank 148 contains switches 150 similar to the switches 112 on the steering wheel 110. That is, basic vehicle equipment that is not accessible to the driver through the different haptic controllers or sets of hotkeys is activated by these switches 150. The switches 150 thus permit the operator (driver or passenger) to access basic vehicle equipment such as hazard lights, traction control, fog lamps, and rear defroster.

The hotkeys 146 in the hotkey bank 144 and the set of hotkeys 134 adjacent to the main haptic controller 132 are similar to the menu keys 114 disposed on the steering wheel 110 and allow immediate access to the function indicated on the particular hotkey. The set of hotkeys 134 adjacent to the main haptic controller 132 may be divided up into two groups, the first group 134a is more proximate to the driver than the second group 134b. The first group 134a gives the driver access to popular controls such as the radio or climate control system, redundant with access provided by the menu keys 114 on the steering wheel 110. The second group 134b gives the passenger access to functions that may be more important to the passenger than the driver such as a separate climate control system for the passenger side.

The hotkeys 146 in the hotkey bank 144 permit the operator access to functions that may or may not overlap with the functions accessible through the other sets of hotkeys. Thus, for example, the hotkeys 146 may allow access to the onboard navigation system, the phone or email systems, or a driver information center or main menu displayed on the display 142, none of which may overlap with any of the other hotkeys. The hotkeys 146 may also permit access to the CD system, overlapping with one of the menu keys 114 on the steering wheel 110. Thus, all of the available functions or equipment to be controlled or displayed may be accessible using one or more of the menu keys or hotkeys in the car, although too many sub-functions exist to permit instant access to each sub-function. The hotkeys 146 may have one or more colors that may be unique (from other hotkeys and/or switches) and correspond with the associated function. In addition, the hotkeys 146 and switches 150 may be backlit by an LED or other similar illumination device.

The main haptic controller 132 functions much like the mini-haptic controller 116 in that the driver can select functions from a particular selection of functions, enter the desired function, select a sub-function and adjust the particular sub-function as desired. Controlling or adjusting the function includes both changing the present state of a function that is active (such as changing the temperature) and activating or deactivating the function (such as turning the air conditioning on or off). Of course, with the main haptic controller 132, the passenger can control the available auxiliary equipment as well as the driver. As used herein, the terms manipulated or actuated refer to moving the main haptic controller in the stated direction enough for the electronics that are connected with the main haptic controller to sense the movement.

However, because the main haptic controller 132 is located on a console between the driver and the passenger, the size limitation of the mini-haptic controller 116 is not present in the main haptic controller 132. This is to say that the size of the motor and the associated mechanisms to provide the different types of tactile feedback is not as severely limited by the console as by the steering column. Thus, the main haptic controller 132 is larger than the mini-haptic controller 116, preferably knob-shaped, and is formed to be easily graspable by the driver. The handle is preferably ergonomically designed for the right hand of the driver in left steering wheel drive vehicles or the left hand in right steering wheel drive vehicles.

The combination of the mini-haptic controller 116 and the main haptic controller 132 permit the control of many standard and optional vehicle functions with a reduced number of input devices. In addition, the mini-haptic controller 116 and the main haptic controller 132 minimize the attention of the driver in accessing the available functions by applying a customized tactile feedback to the driver through the particular haptic controller being manipulated.

Figure 7:
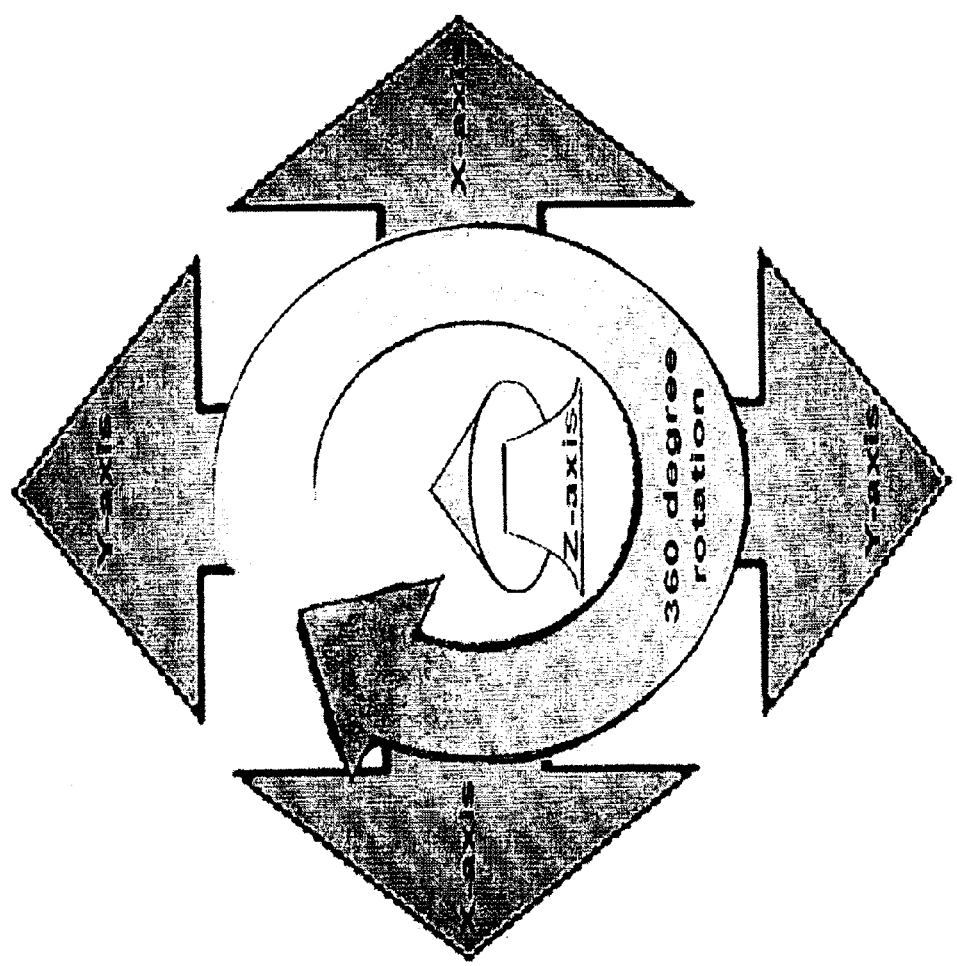
FIG. 7 shows possible motions of an embodiment of the main haptic controller of the present invention.

The main haptic controller 132 may be operated through different manipulations. The main haptic controller 132 may be manipulated in a horizontal (x-axis) direction towards the driver or front passenger, vertical (y-axis) direction toward or away from the front of the vehicle, perpendicular (z-axis) direction toward the road, or rotated 360° as shown in FIG. 7. The main haptic controller 132 is manipulated in the x or y direction to select a particular function. Once the main haptic controller 132 has been manipulated in the x, y, or z directions and then released, a return mechanism automatically returns the main haptic controller 132 to a neutral center position. This permits the operator to find the main haptic controller 132 at the same location if he or she has to release it for any reason, thus avoiding having to search for the controller. Such haptic controllers and associated electronics, interfaces, and computer control system are conventional, and as such the underlying mechanisms will not be discussed herein.

The display 142 is an LCD, ECD, organic LCD or other similar display that is connected with the appropriate electronics to drive the display. Although shown as being disposed between the driver and passenger, the display 142 may be located anywhere convenient, such as above the steering wheel 110 or even projected onto the windshield near the driver. Similarly, multiple displays 142 may exist within the vehicle, for example, one for the driver and another for the passengers. The display 142 receives inputs from the main haptic controller 132 and from the hotkeys 146 in the bank 144 below the display 142 via a communication bus.

Figure 8:
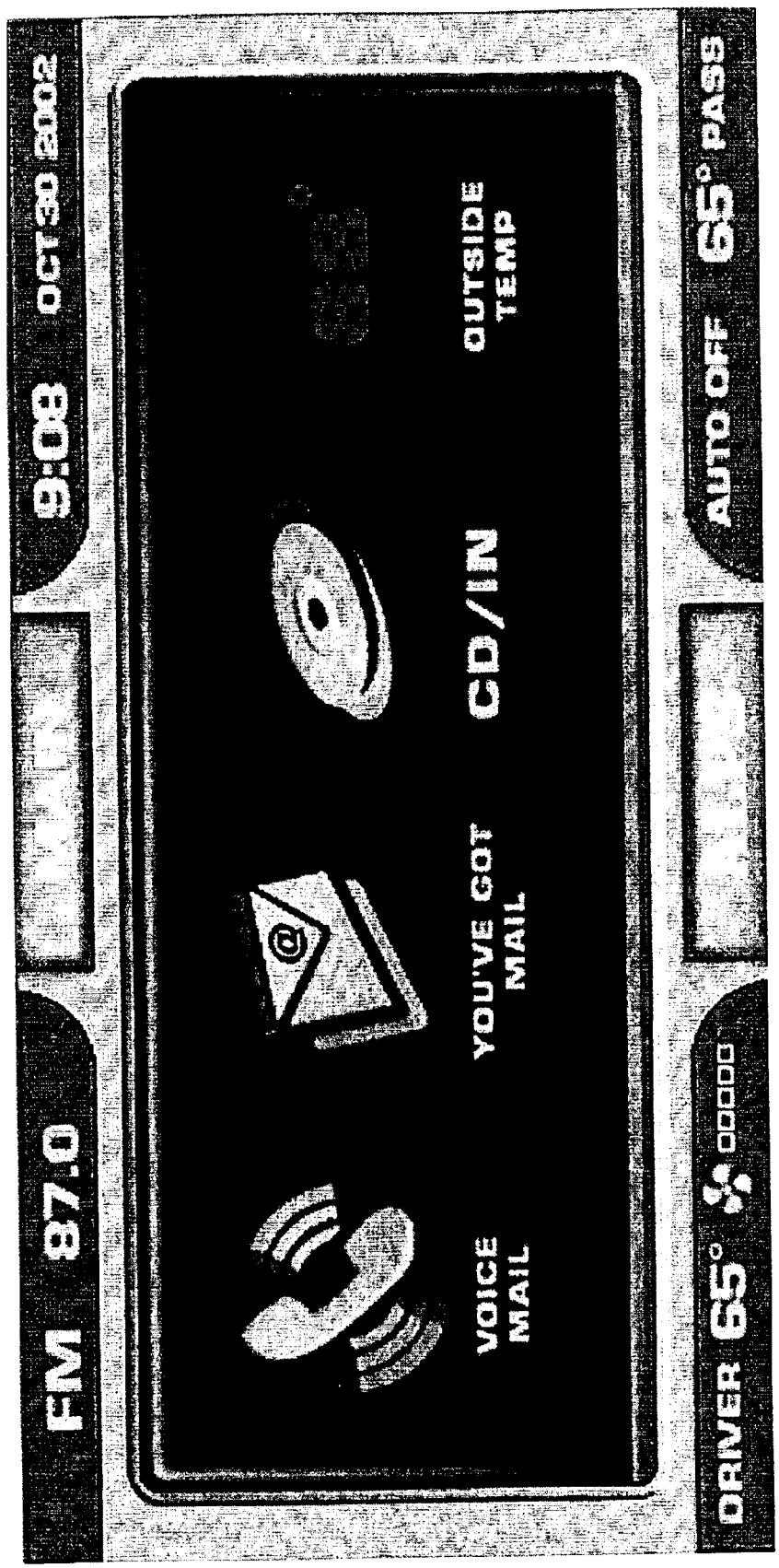
FIG. 8 illustrates a main screen display of an embodiment of the present invention.
Figure 9A:
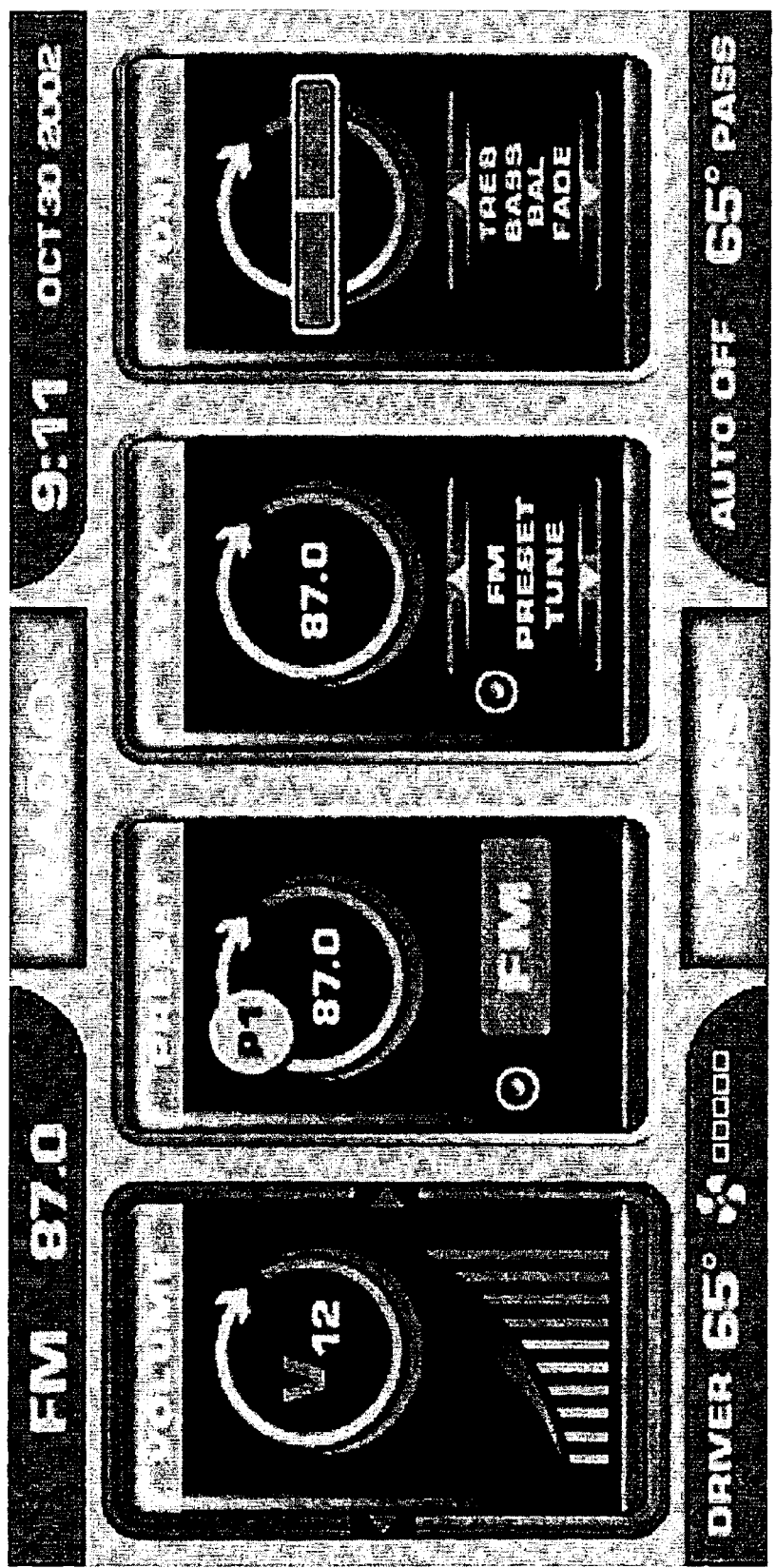
FIGS. 9a and 9b illustrate a radio screen display and functionality of an embodiment of the present invention.
Figure 9B:
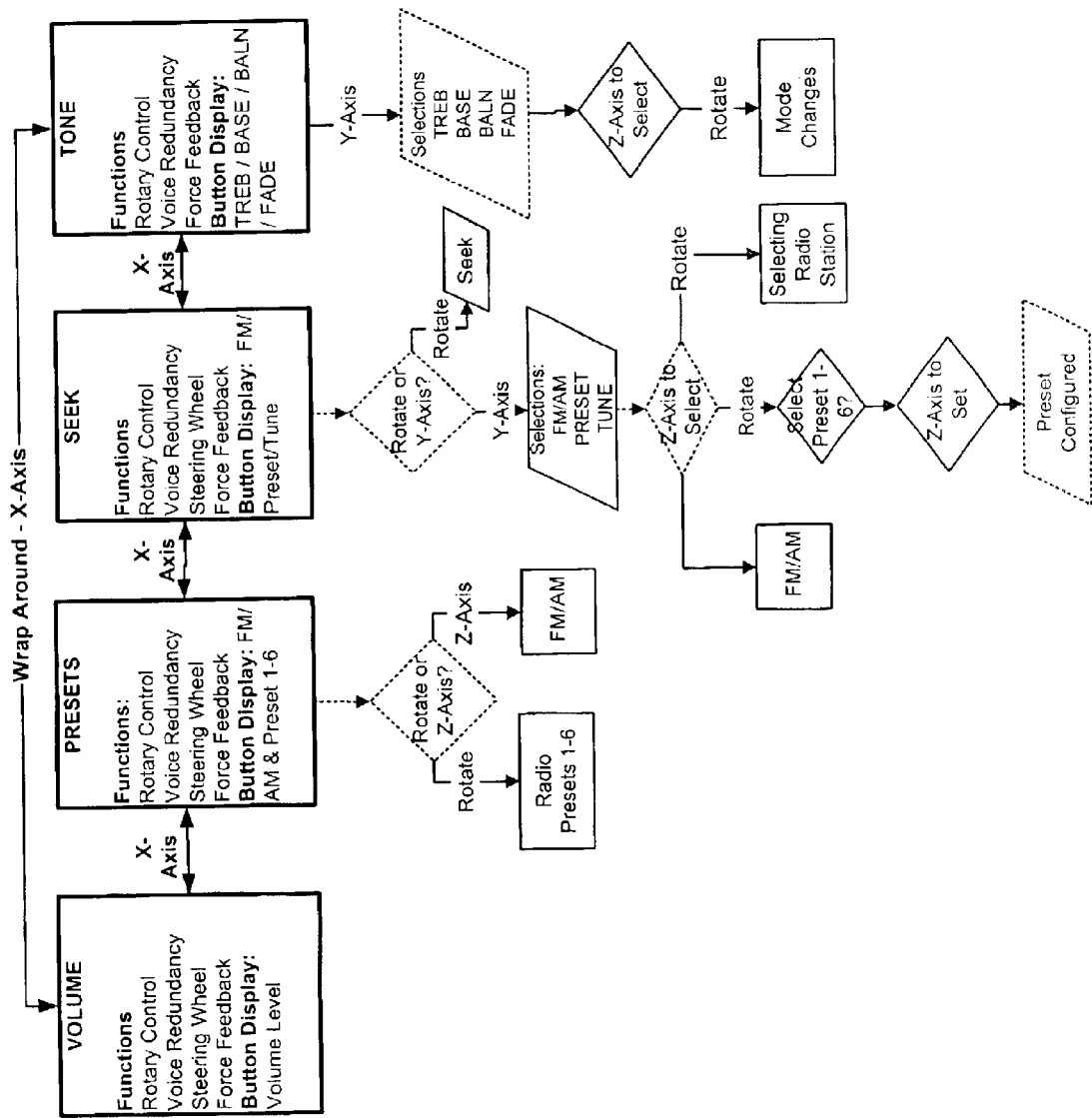
Figure 10A:
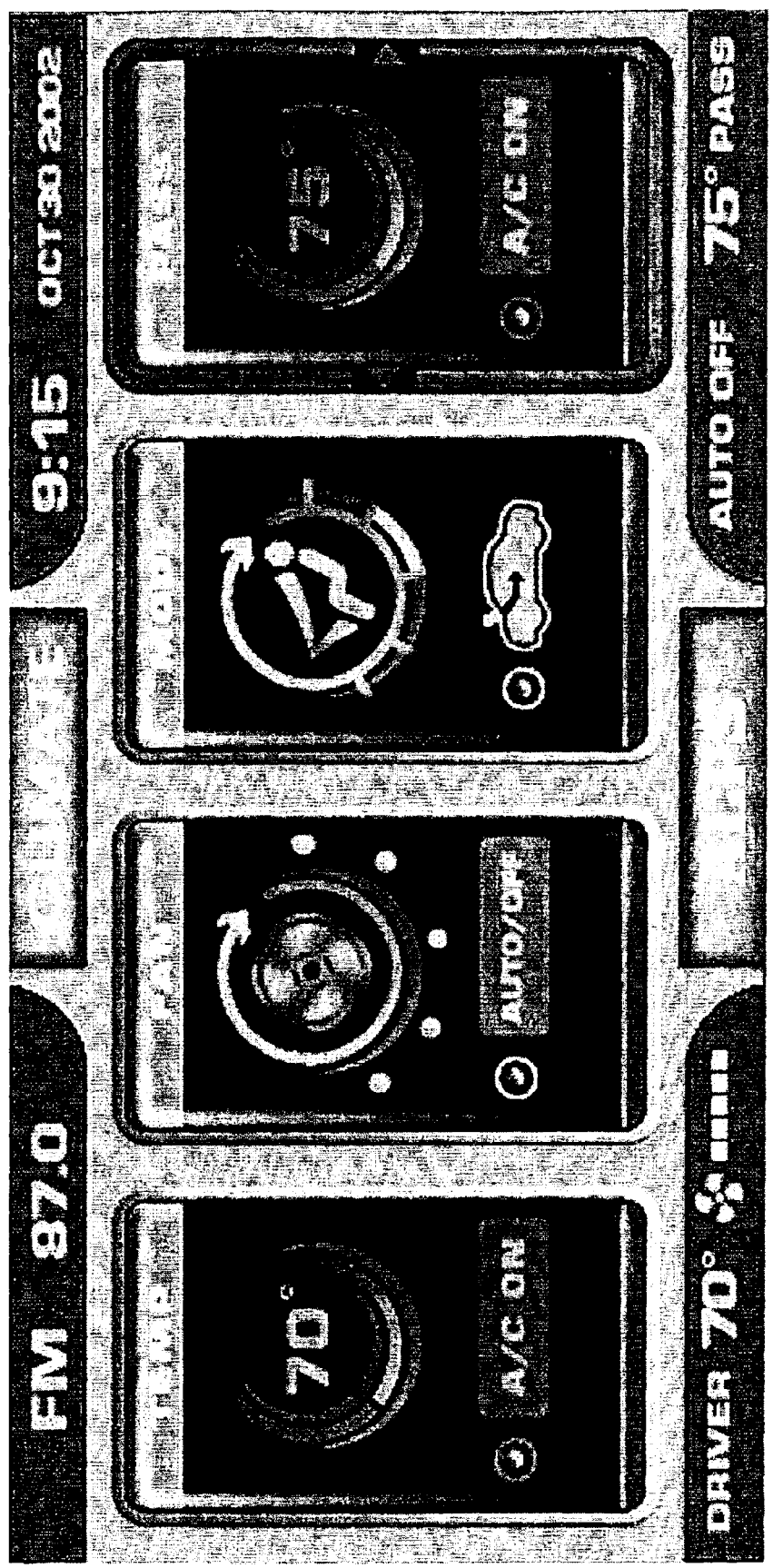
FIGS. 10a and 10b illustrate a climate control screen display and functionality of an embodiment of the present invention.
Figure 10B:
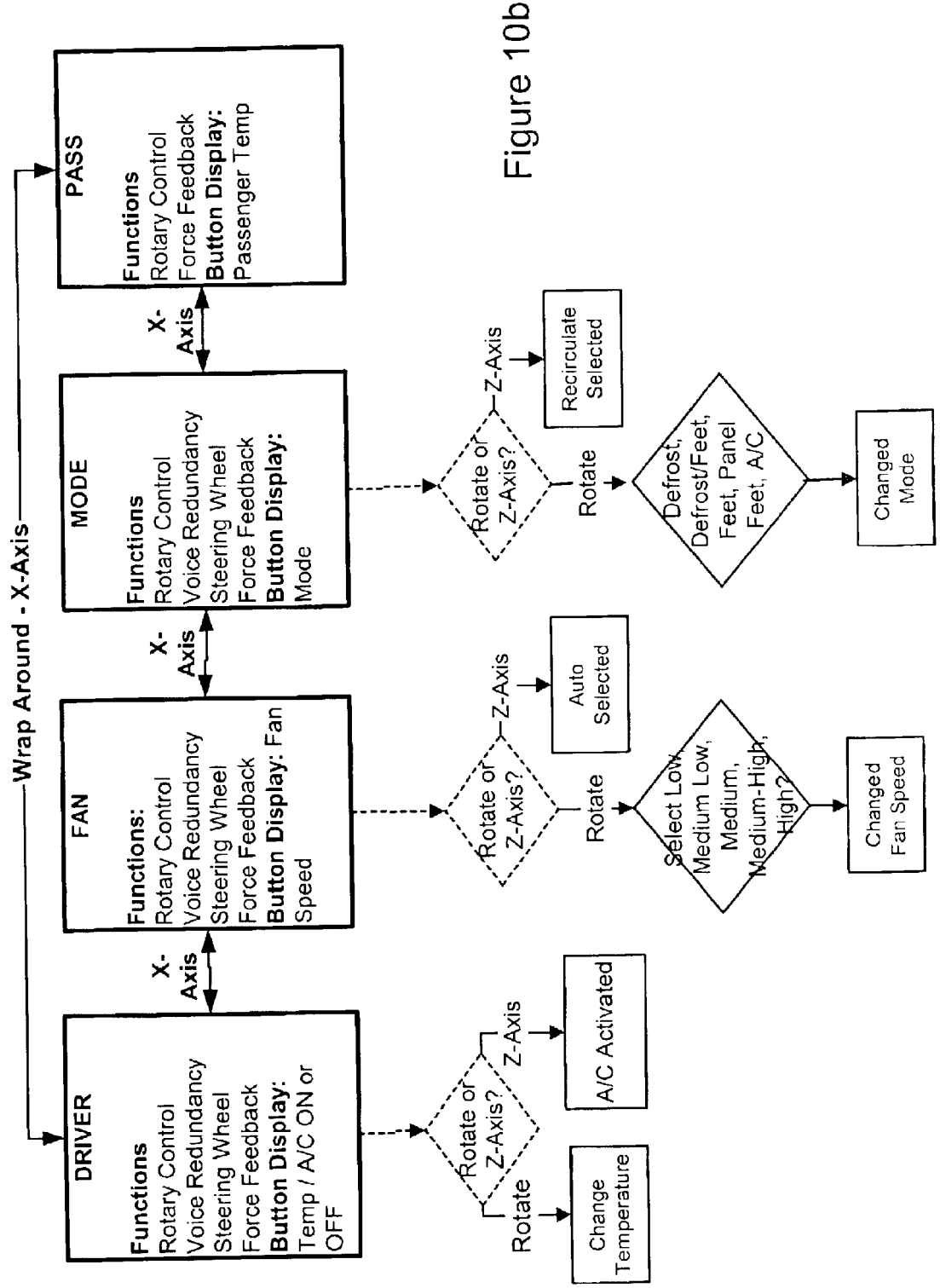
Figure 11A:
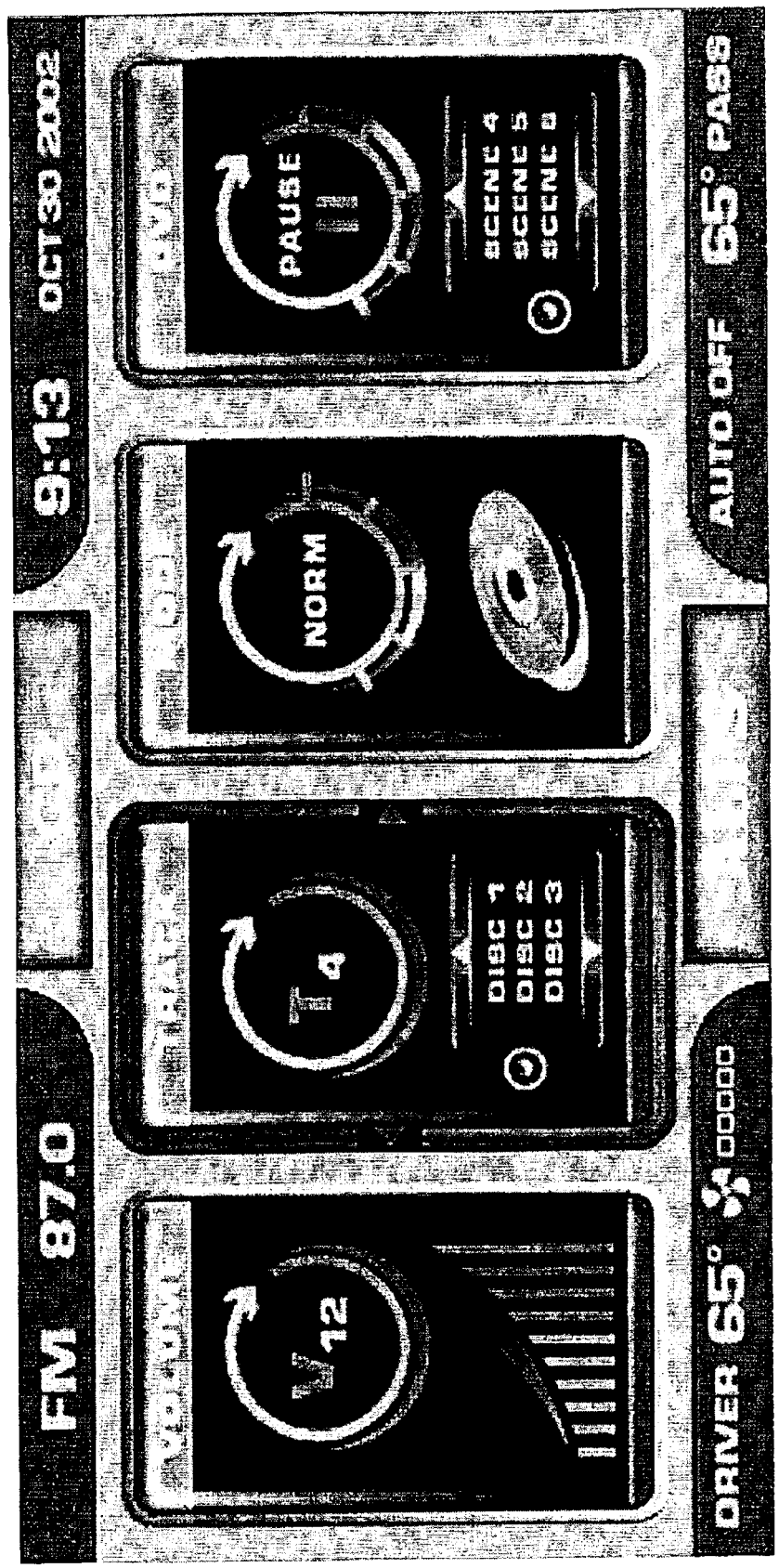
FIGS. 11a and 11b illustrate a CD/DVD screen display and functionality of an embodiment of the present invention.
Figure 11B:
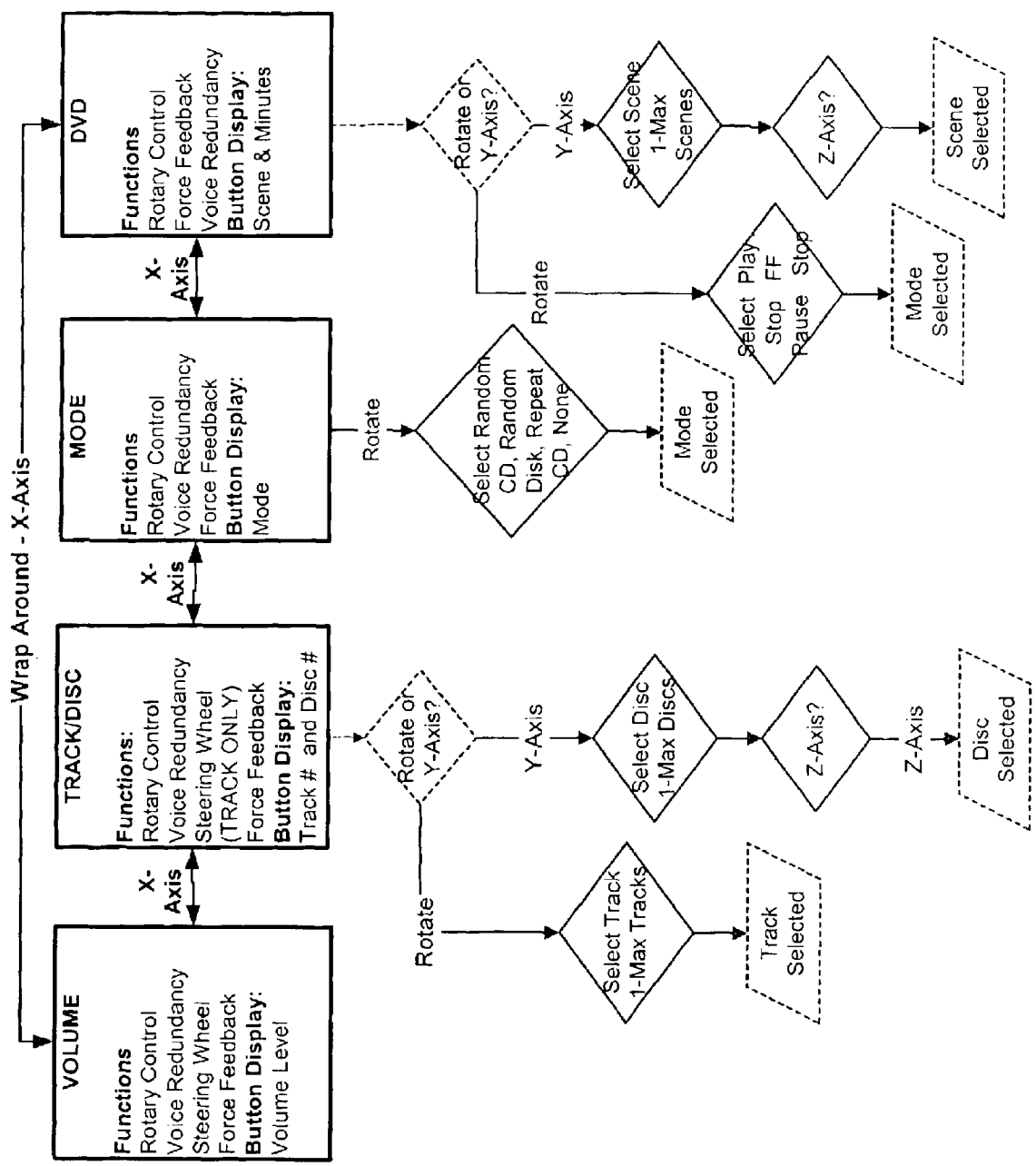
Figure 12:
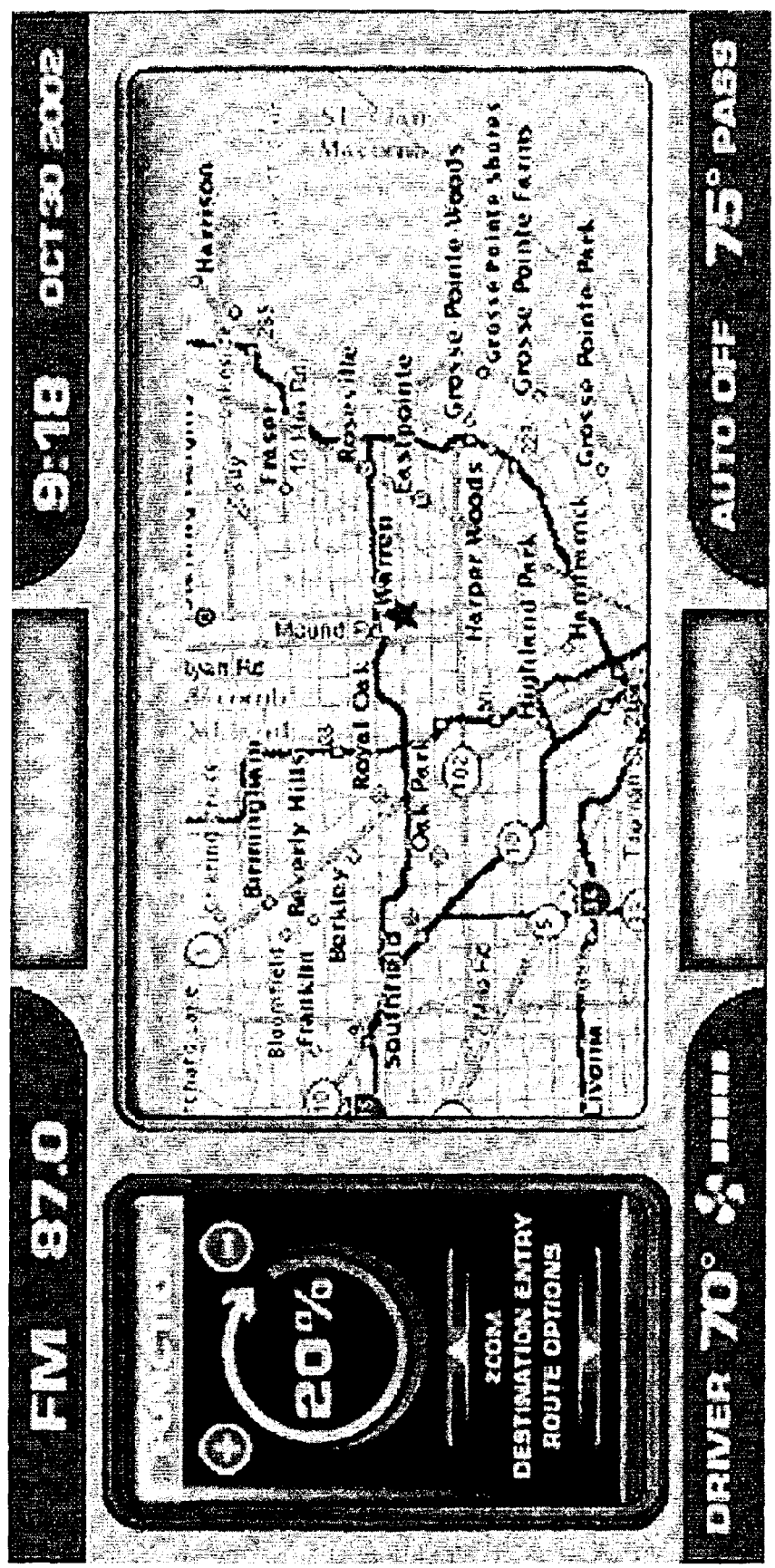
FIG. 12 illustrates a navigation screen display of an embodiment of the present invention.
Figure 13:
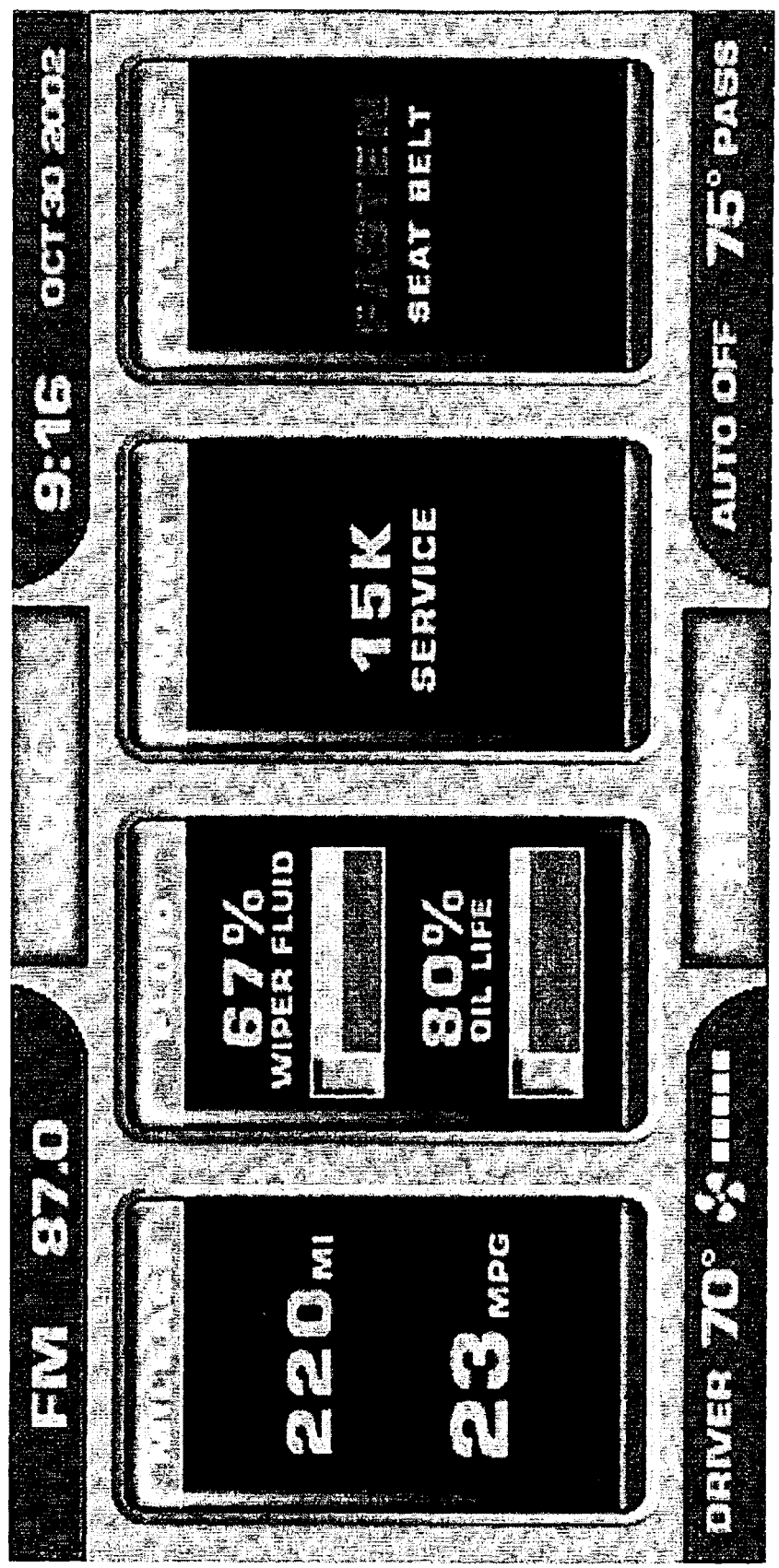
FIG. 13 illustrates a driver information center screen display of an embodiment of the present invention.
Figure 14A:
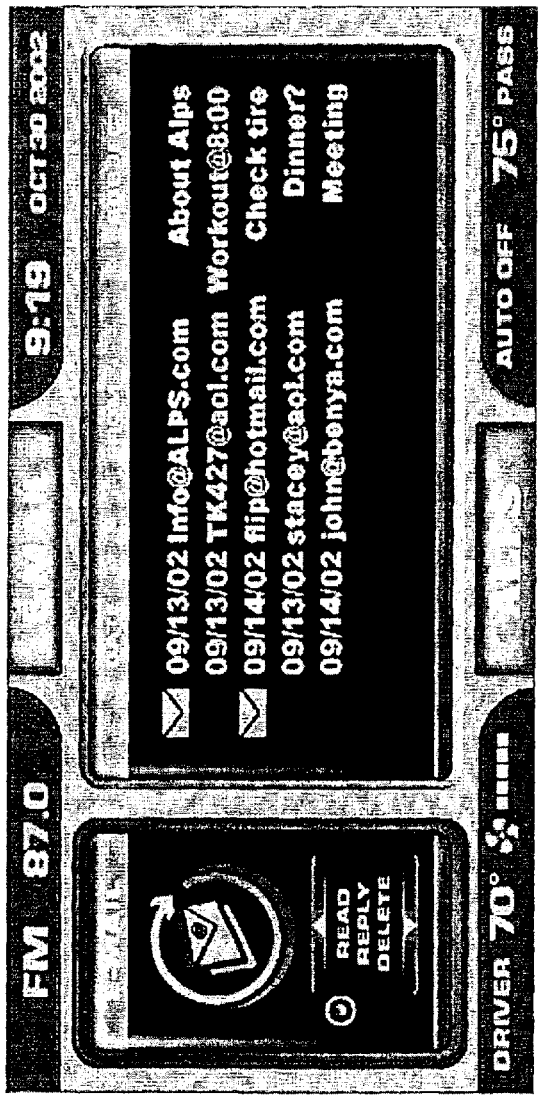
FIGS. 14a, 14b, and 14c illustrate email screen displays and functionality of an embodiment of the present invention.
Figure 14B:
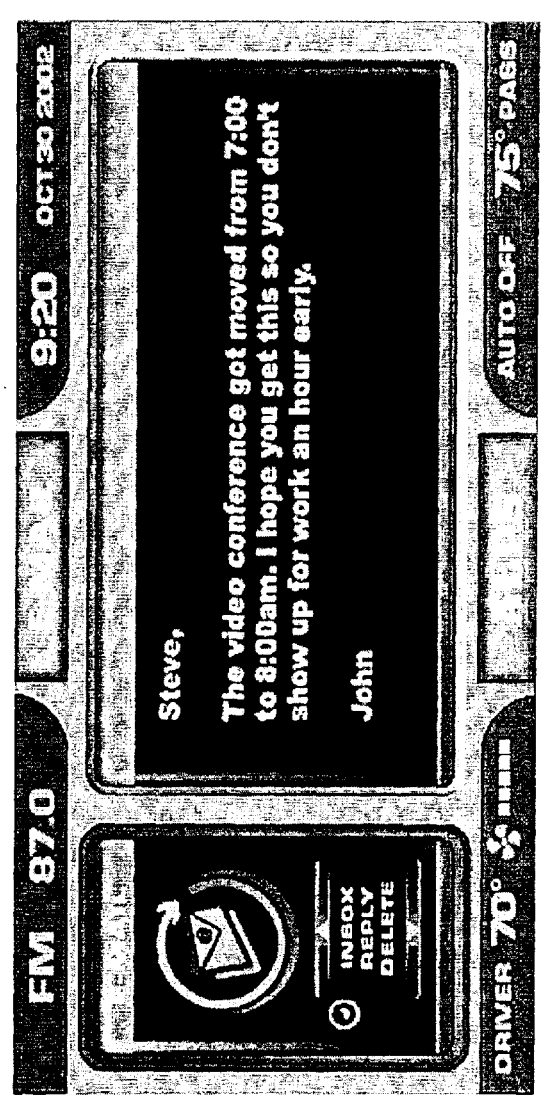

The display 142 displays interaction options between the operator of the haptic controller as simulated mechanical controls of the functions available to be accessed in the present state of the haptic control system; that is, the display 142 shows the system presently accessed as well as the functions within that system. These on-screen simulated mechanical controls are preferably buttons, mimicking the manner in which the functions are accessed conventionally (i.e. through individual buttons on the steering wheel), thereby giving a sense of familiarity and ease to the operator. The display 142 displays each system of the overall Infotaiment system in a different screen. Examples of various screens of the display 142 are shown in FIGS. 8–15. FIG. 8 depicts the main screen; FIG. 9a, the radio screen; FIG. 10a, the CD screen; FIG. 11a, the climate control screen; FIG. 12, the driver information center; FIG. 13, the navigation screen; FIGS. 14a and 14b, email screens; and FIGS. 15a and 15b, phone screens. The display 142 thus illustrates the Infotaiment system of the vehicle.

As shown in these figures, the buttons thus represent control of particular functions and contain both textual and pictorial information. The textual information indicates the function of the button. The pictorial information illustrates an appropriate symbol indicating the function of the button, one of the sub-functions of the function, or the operation to control the function or the sub-functions. The pictorial information also contains interactive graphics that display the present state of the function through graphical and/or alphanumerical information. For example, in the screen of FIG. 11a, the graphics of the Volume function includes the interactive bar graph as well as the "V" (volume) and the interactive subscript number showing the volume level, whereas the graphics of the DVD function is the interactive alphanumeric string in the circular arrow indicating that the DVD is in a present paused state as well as the graphic illustrating the pause symbol. In the latter case, the pictorial information includes the circular arrow, the list of DVD scenes to select, the up and the down arrows, and the dot beside the currently paused (and highlighted) scene.

In fact, the information is primarily displayed graphically on the display 142 rather than textually. This is to say that the amount of text on the screen is limited, to avoid the operator having to refer to the screen for excessively long periods of time to determine which function or sub-function has been accessed and how to actuate that function or sub-function. If numerous buttons are present in a screen, they can be accessed through x-axis operation of the main haptic controller. The operation "wraps around" so that if the last button is reached, an additional operation in the same direction brings the selection back to the first button.

In one example, referring to FIG. 9a (the radio screen), the volume control is initially accessed. The button representing the function volume control is highlighted. The word "VOLUME" is prominently displayed at the top of the button, having both a different background color (blue) than the general background that the buttons are on (gray) or background color of the button (black) and different colored text (white) than either background. Similarly, the text of the name of the system is displayed on the top center of the screen. The text and background colors are chosen to contrast with each other, thereby permitting the viewer to readily identify the text. For similar reasons, the display is formed such that the general background that the buttons are on and the buttons contrast with each other. The buttons are also outlined in a varying white/gray shade so that the buttons appear to the viewer to be three dimensional and the color outlining the function selected (red) contrasts with the various other colors present on the display.

Below the text, but within the button, a symbol indicating the manner to adjust the volume is displayed. As shown, the button indicates that the main haptic controller 132 must be rotated to change the volume. The symbol has interactive alphanumeric information that indicates the present setting (as shown volume level 12 has been reached). In addition, an interactive graphic that shows the present volume is disposed below the symbol. In this case, the graphic is a bar graph with different sizes of the bars that light up when the particular volume is reached (as well as the smaller bars indicating lower volumes remaining lit up).

Another button in the radio screen, for example, the seek button, has a symbol that indicates that the main haptic controller must be rotated to seek the next station. The present station selected (an interactive feature) is shown as 87.0 FM in the middle of the circular arrow that indicates that rotation is necessary to change the station. The interactive graphic below the symbol and text shows that the main haptic controller 132 must be manipulated in the y direction to select between the available sub-functions of selecting either AM/FM (presently on FM), selecting a preset station, or manually tuning the radio through rotation. As shown, the currently selected sub-function FM is highlighted in a different color than the text showing the other options. To change from volume control to switching between AM and FM in this menu, the highlight shows that the main haptic controller 132 must first be manipulated in the x direction to select the desired button (SEEK), then manipulated in the y direction to choose the desired sub-function (AM/FM), and then switched to AM by pushing the main haptic controller 132 in the z direction, as indicated by an encircled dot beside the text.

In addition to the text present in the buttons, other textual information indicating settings of functions of the haptic control system other than the functions available in the present state are displayed outside the buttons. Along the boarders of the display 142, the time and date are displayed in one corner, the current radio station or CD and track number are displayed in a second corner, the driver climate control information is displayed in a third corner, proximate to the driver, and the passenger climate control information is displayed in the fourth corner, proximate to the passenger. This additional information is generally the information that is most desired to be reviewed and changed by the driver or passenger. Thus, for example, if the driver is interested in the set temperature of the driver climate control, he or she does not have to manipulate the haptic controllers or press the hotkeys to switch into that menu and then look at the display, he or she merely looks at the screen as the information is readily available in all menus. In addition, the manufacturer of the product, ALPS, is optionally displayed between the information in the corners.

Each manipulation of the main haptic controller 132 in the x or y direction changes the selection singularly. In other words, to move the presently selected button on the display 142 two buttons to the right, the main haptic controller 132 must be manipulated from the center to the right side twice. While multiple motions with the main haptic controller 132 may therefore be required, the single selection also prevents "overshoot" of the selection by the driver as well as permitting the driver to know exactly which button he or she has selected without having to look at the display 142.

In addition, tactile feedback is provided for operation of the main haptic controller 132 consistent with the operation to control the particular function or sub-function of the particular button when the particular button has been selected by the operator. Tactile feedback is provided when adjusting the sub-function (such as changing the amount of treble or bass in the Tone function of the Radio menu shown in FIG. 9a or altering the Fan output the Climate control screen shown in FIG. 10a). Alternatively, tactile feedback may be added when changing from function to function in a particular menu or from menu to menu.

Figure 16:
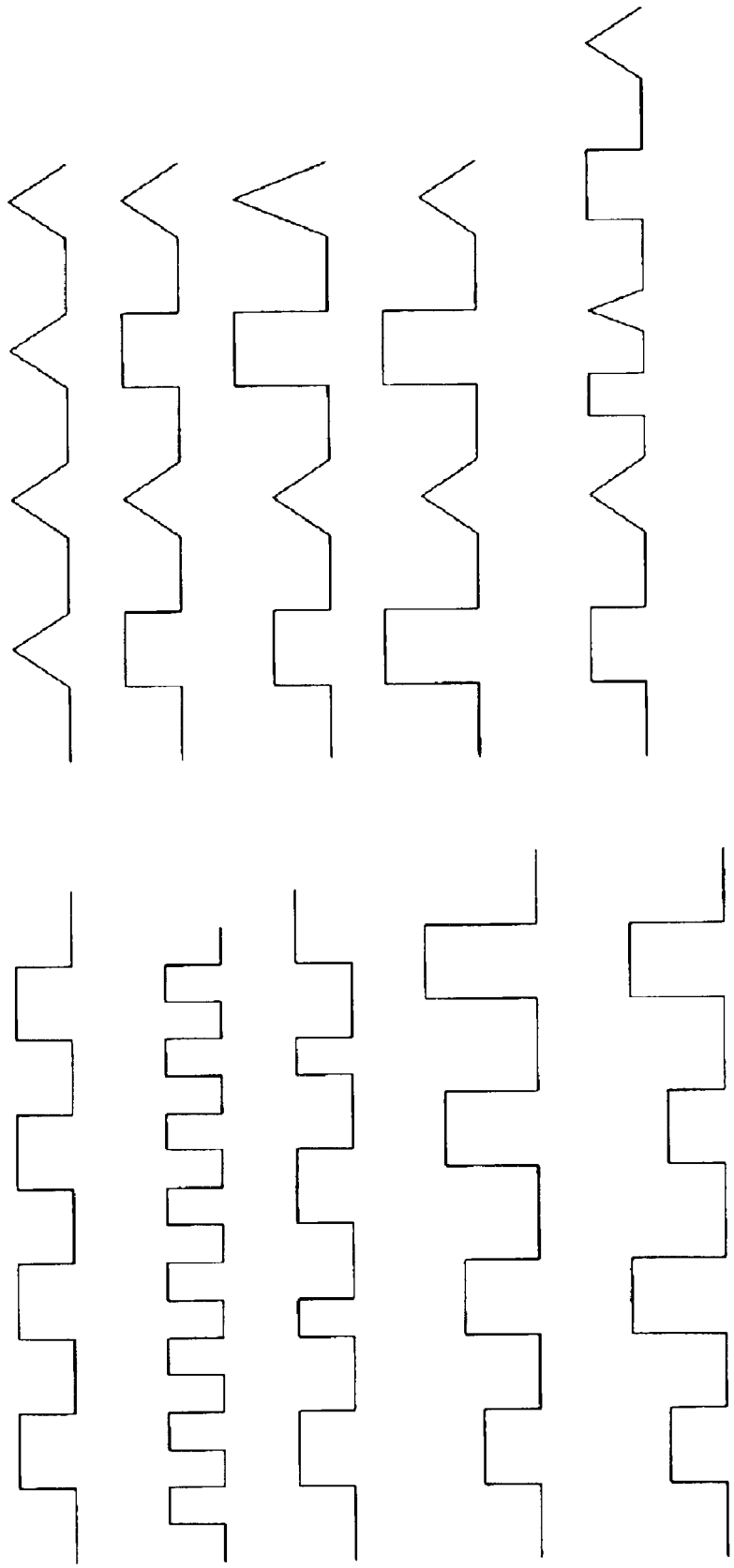
FIG. 16 shows different embodiments of tactile feedback supplied in an embodiment of the present invention.

This feedback can be uniform or dependent on the function or sub-function and change in that function/sub-function. In one example of a dependent force, when increasing the volume level, the operator experiences an increasing force as the volume increase. The feedback supplied may be the same in amplitude, frequency, and shape or may differ depending on the particular function operated. For example, the tactile feedback provided as the operator adjusts the volume may have twice the frequency of the feedback provided as the operator adjusts the fan speed. Alternately, the tactile feedback provided as the operator adjusts the volume may have a constant force in each interval while the feedback provided as the operator adjusts the fan speed may be increasing and then decreasing in each interval (triangular shaped waveform). Examples of different feedback used are shown in FIG. 16 with the horizontal direction being time and the vertical direction being force supplied to the haptic controller. Note that these are merely exemplary, may more possible combinations of feedback force shape, frequency, and amplitude exist so that the function and sub-functions may be individually identified by touch alone.

While tactile feedback does not have to be provided when switching between different buttons due to the singular nature of the manipulation of the main haptic controller 132 above, it may be added as a redundancy to the control system. Similarly, voice redundancy is provided for limited functions and supplies audible feedback of the input selected by the operator. Voice redundancy is activated if a new screen is selected or a new function within that screen is selected.

A more thorough description of the different screens/menus of the display are discussed below. The different screens of the LCD are of various types, which are listed in table 1 below.

TABLE 1

LCD Screen

| Screen Name | Screen Type |
| --- | --- |
| Main screen | Static |
| Radio | Dynamic |
| CD | Dynamic |
| Climate | Dynamic |
| Driver Information Center | Static |
| Navigation | Dynamic |
| E-Mail | Dynamic |
| Phone | Dynamic |
| Alps Logo | Static |

Dynamic screens permit the haptic controller to navigate through the screen while static screens do not permit controller activity and merely display information on the display 142. The Alps Logo screen (or other customized designed logo) will appear for a limited amount of time, five seconds, when the car is initially turned on. The functions are arranged such that there is minimal, if any, nesting of the functions into different screens requiring scrolling through these different screens. This is to say that rather than displaying a list of functions, having a desired function selected and accessed, which then leads to another list of functions to control with the previous list being erased, as in the prior art, the current embodiment uses pictorial information to display most, if not all, of the available functions without having to scroll through different screens. Furthermore, as each screen may be accessed by a hotkey, there is no need to manipulate the main haptic controller to maneuver from one screen to another screen. Thus, rather than having to memorize a pattern of: manipulate the haptic controller up x times, right y times, down once, left once, to get from one desired sub-function in one function of one screen to another desired sub-function in another function of a different screen (or from one sub-function to the another of the same function) without on-screen help, as in the prior art, the operator merely pushes the appropriate hotkey and moves the main haptic controller in the x direction so that the desired function is outlined, manipulates it in the y direction so that the desired sub-function is highlighted, and rotates or pushes down on it so the desired adjustment is obtained. Furthermore, in the screens of the present embodiment, unlike that of the prior art, the haptic controller retains all of its degrees of freedom, that is, manipulating the haptic controller in all screens where multiple functions are available has some effect: permitting selection or control of a function or sub-function.

The main screen is displayed under the following conditions: startup after the Alps logo disappears, the main screen hotkey is depressed, the system defaults to the main screen after a set amount of time of inactivity, such as 30 seconds, except for predetermined systems (e.g. Navigation and Radio) that are much more likely to be frequently altered or require much more time to review. Similarly, in one or more screens, the control system defaults after a predetermined amount of time of inactivity to the function used most often (e.g. in the Radio or CD menu, the volume is the default). Of course, both the default times and the default functions or screens can be set by the operator. The main screen displays the present radio station that the radio is tuned to, the external temperature (outside the vehicle), a voicemail indicator, and an email indicator. The latter two indicators let the driver know if new voicemail or email has arrived since the last time he or she has accessed the particular system. An example of the main screen display is shown in FIG. 8. The colors of all of the highlighting, outlining, textual and pictorial information display, and backgrounds are chosen for the contrast reasons above.

An example of the Radio screen is shown in FIG. 9a. The Radio screen contains the following functions: Volume, Preset, Seek, and Tone. The Seek and Tone functions have multiple sub-functions. The Volume function allows the operator to adjust the volume of the audio system. The present volume is shown in text supplied with the associated symbol as a number as well as graphically in an increasing bar graph. The Preset function permits selection of the AM or FM band by pressing the main haptic controller in the z direction as well as selection of multiple preset stations within the AM or FM band by rotating the main haptic controller. The preset being used, as well as the actual station selected, is shown in text supplied with the associated symbol. The Seek function allows, first through y-axis manipulation and then z-axis actuation, selection of the AM or FM band, tuning within the selected band (rotation to find station), and setting of the different preset stations with the selected band (rotation to find station, then z-axis actuation to set). The station selected is shown in text supplied with the associated symbol. The Tone function permits selection (y-axis manipulation and z-axis actuation) and adjustment (rotation) of the treble, bass, balance, and fade. Upon entering the Radio (or CD) screen, the driver or passenger has immediate control of the volume by rotating the main haptic controller. The default volume level upon entering is 5 on a scale of 1 to 10. The voice redundancy works in conjunction with the music volume; the music is muted by the vocal feedback and the driver will not be able to hear the music and voice redundancy simultaneously. The voice redundancy announces 'RADIO' when entering the Radio screen, 'VOLUME' when entering the Volume function, 'PRESET' when entering the Preset function, 'SEEK' entering the Seek function, and 'TONE' when entering the Tone function. A double push of any audio hotkey (i.e. Radio, CD) will turn off that function. FIG. 9b summarizes the functionality of the radio screen.

An example of the Climate is shown in FIG. 10a. The Climate Control screen contains the following functions: Driver, Fan, Mode, and Pass. The Driver/Pass function allows the operator to adjust the temperature on the driver/passenger side (rotation) and turn the air conditioning on or off (z-axis actuation). The temperature setting is shown as text in the associated symbol. The Fan function allows the operator to adjust the fan speed through five fan settings (low, medium low, medium, medium high, and high) by rotation or permit automatic fan selection by computer control through z-axis actuation. The Mode function allows the operator to adjust the mode by rotating the main haptic controller to direct the air flow to the front panels, defrost, or towards the feet. The operator can also choose to re-circulate the air in the vehicle by actuating the main haptic controller in the z direction. Upon entering the Climate Control screen, the driver or passenger has immediate control of the driver side temperature by rotating the main haptic controller. The voice redundancy announces 'CLIMATE' when entering the Climate Control screen, 'TEMP' when entering the driver or passenger temperature control function, 'MODE' when entering the Mode function, and 'FAN when entering the Fan function. A double push of the Climate hotkey will turn off the climate control function. FIG. 10b summarizes the functionality of the climate control screen.

An example of the CD screen is shown in FIG. 11a. The CD screen contains the following functions: Volume, Track, Mode, and DVD. The Volume function duplicates the Volume function of the Radio screen. The Track function permits the operator to select the desired CD and track by manipulating the main haptic controller in the y direction to the desired CD, pressing downward in the z direction to choose the highlighted CD, and then rotating to select the track. The track selected is displayed within the rotation symbol as T with the track number. The Mode function allows the user to rotate the main haptic controller to choose between a normal play mode, random CD play mode, random track play mode, and repeat CD mode. The current mode is shown inside the mode adjustment symbol. The DVD function permits the user to rotate to establish one of the DVD modes: Play, Stop, Rewind, Fast Forward, Pause, Scene 1-Max or select the scene through y-axis manipulation and then z-axis actuation. The current DVD mode is shown both textually and symbolically within the DVD mode adjustment symbol. Upon entering the CD screen, the operator has immediate control of the volume. The voice redundancy announces 'CD when entering the CD screen, 'VOLUME' when entering the Volume function, 'DISK when entering the Track function, 'MODE entering the Mode function, and 'DVD when entering the DVD function. FIG. 11b summarizes the functionality of the CD screen.

An example of the Navigation screen is shown in FIG. 12. The Navigation display contains only one function with multiple sub-functions. The operator may opt to enter a destination, zoom in on the map of that location, or plot a route to that location and get directions using standard available GPS controls. The operator is able to zoom-in and out with rotation of the main haptic controller with the amount of zoom being displayed within the rotation symbol. Upon entering the Navigation screen, the voice redundancy announces 'NAVIGATION', and a map of the current position is the first map displayed. The navigation inputs can be achieved through the use of input screens similar to those used in standard GPS devices used in vehicles, i.e. through successive entry of the state, city, street, and location on the street in different alphanumeric and alphabetic listing screens.

An example of the Driver Information Center display is shown in FIG. 13. The Driver Information Center screen contains no functions and merely displays vehicle information in a textual and pictorial format. The information displayed includes Mileage, Fluids, Maint, and Systems. The Mileage button shows the current mileage since last being reset (control on the steering wheel) and miles per gallon over this mileage, both of which are displayed numerically. The Fluids button indicates the amount of windshield wiper fluid and lifetime of the oil both numerically and graphically as bars of different colors filled to the appropriate amount. The Maint button numerically displays the mileage until the next maintenance or service for the vehicle is required. The Systems button displays any problems with the vehicle textually, for example, driver's side seatbelt unfastened, door open, check engine, or low fuel. Upon entering the Driver Information Center screen, the voice redundancy announces 'DRIVER INFO'. Other functions may be available, such as a clock set function to set the time/date of the system.

Figure 14C:
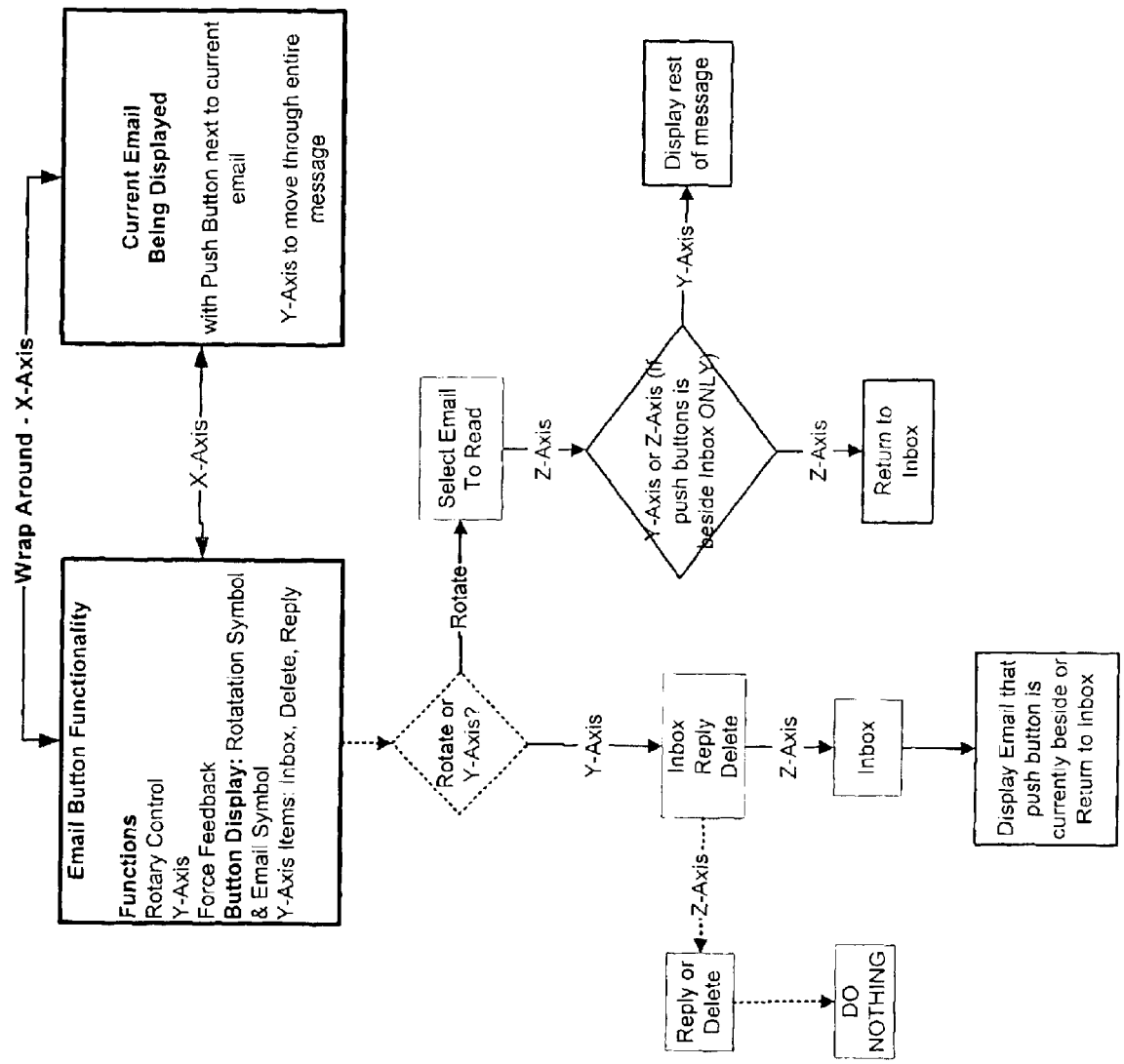

An example of the email menu display is shown in FIGS. 14a and 14b. FIG. 14c summarizes the functionality of the Email screen. The Email screen contains only one function with multiple sub-functions. In the inbox screen, shown in FIG. 14a, the email button is disposed on the left side of the screen with current emails (the inbox) displayed in a larger box to the right of the email button. The email function contains the main sub-functions: Read, Reply, and Delete, which are selected by y direction manipulation and activated by pressing in the z direction. The inbox shows which emails have not yet been read (as shown, the envelope at the side of the email), the date received, the sender, and a few words of the subject line, much like conventional computer email systems. The operator can select an email in the inbox by rotating the main haptic controller, the email selected being highlighted.

If an email is selected and read, the inbox screen changes to a read screen that displays the text of the email, as shown in FIG. 14b. At the same time the email button changes so that the first sub-function becomes Inbox, rather than Read. The operator, if he or she does not wish to reply or delete the particular email displayed, can return to the inbox by pressing the main haptic controller again while the Inbox sub-function is highlighted. Thus, the operator can transition between the inbox and the message that is displayed by z-axis movement as long as the push button symbol is beside the Inbox choice on the email button.

Of course, as in conventional computer systems other mailboxes and associated email screens can be added, while sub-functions to choose the added mailboxes (and go back to the inbox if in the other mailbox) are added to the email button.

No voice redundancy is provided for transitioning between mailboxes or executing an email function. This system preferably does have a text to speech function that allows the computer to read the email to the driver, thereby again permitting the attention of the driver to remain on the road rather than on the display 142. This is also true for phone messages voicemail as described below. However, the occupants of the vehicle are notified of a new message on the main screen shown in FIG. 8 and by the voice redundancy system stating 'YOU'VE GOT MAIL' or some similar announcement. The operator can then press the email hotkey to enter the email screen shown in FIG. 14a. Upon entering the email main menu, the voice redundancy system announces 'EMAIL'.

Figure 15A:
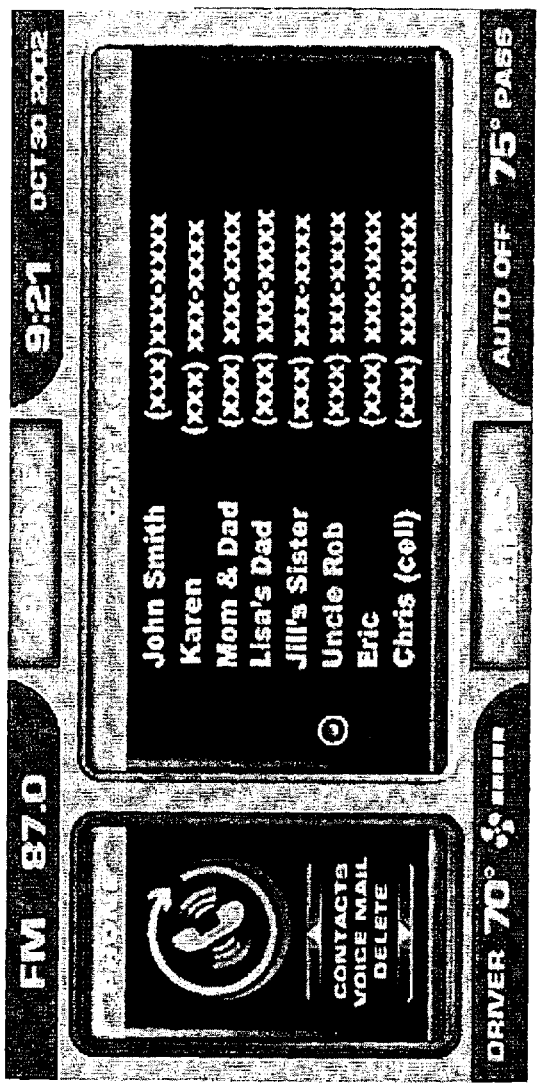
FIGS. 15a, 15b, and 15c illustrate phone/voicemail screen displays and functionality of an embodiment of the present invention.
Figure 15B:
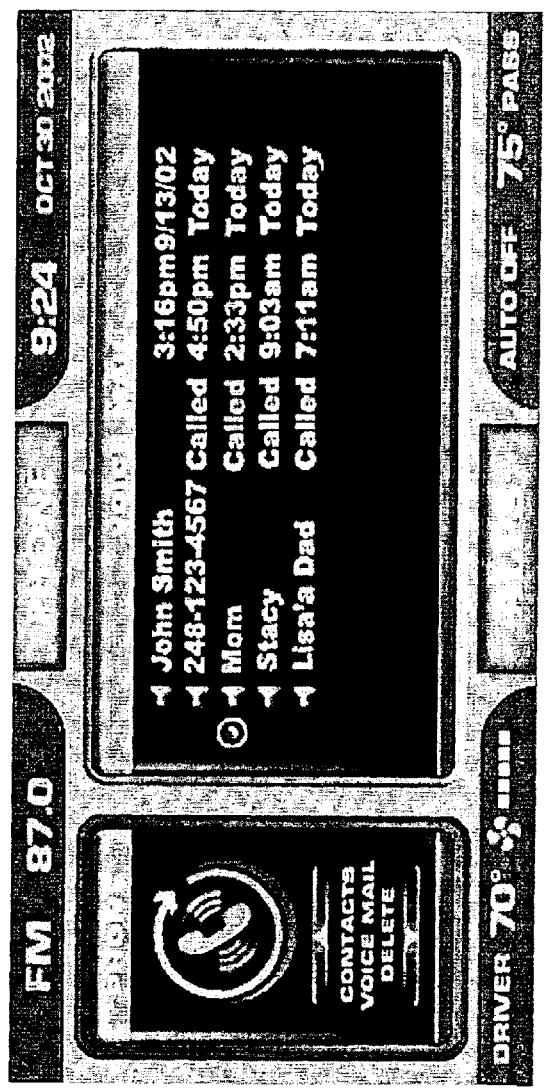
Figure 15C:
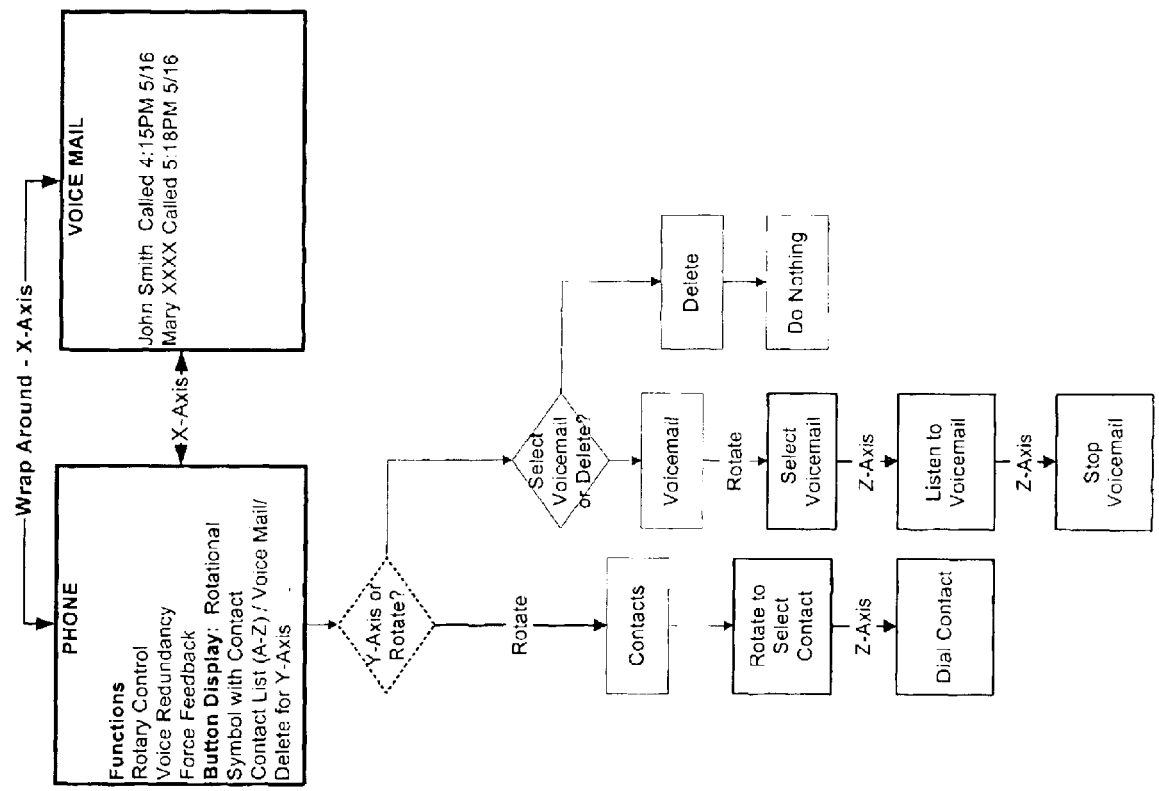

An example of the phone menu display is shown in FIGS. 15a and 15b. FIG. 15c summarizes the functionality of the Phone screen. In the main Phone screen, the phone button is disposed on the left side of the screen with the appropriate list displayed in a larger box to the right of the phone button. The phone function contains the sub-functions: Contact List, Voice Mail, and Delete, which are selected by y direction manipulation. In the Contact List, as shown in FIG. 15a, the contact person and number are displayed in alphabetical order in the box to the right of the phone button. To call a particular contact, the operator rotates the main haptic controller to highlight and select that contact, and then actuates the controller downward in the z direction.

When the Voice Mail is selected, the screen changes to a display similar to that illustrated in FIG. 15b. The main voicemail screen shows the person (or number if the person is not in the contact list or otherwise known), whether or not the operator has called the person back after having accessed the voicemail, and the time and date the voicemail was received. To play a particular voicemail, the operator rotates the main haptic controller to highlight and select that voicemail, and then actuates the controller downward in the z direction. At that point the voicemail message, whether old or new, will be broadcast through the vehicle speakers. Other sound (music, video sound) will be muted and CD and DVD play can be suspended when voicemail has been selected by the operator or when the voicemail is to be played. Voicemail replay can be stopped by z-axis motion of the main haptic controller and the other sound will once again commence. When the voicemail message has finished or the voicemail function has been deselected by z-axis actuation, the voicemail functionality will automatically turn off, the CD/DVD will resume if appropriate, and the other sound will return from muted to the volume level of its last state.

In either the Contact List or Voice Mail screens, the particular listing can be deleted through the Delete sub-function by selecting the particular listing, moving to the Delete function and actuating in the z direction. Any suitable technology may be used to transmit or receive information (phone/email), such as 2.4 GHz Bluetooth or other wireless technology.

In addition, a voice recognition system may be added to the above. Voice recognition systems have increased in power and versatility in the last few years and are generally well known, although the application in vehicle technology is limited, at best. The application of a voice recognition system, however, is likely to increase the safety of the control system by allowing the driver to control a desired function while not requiring the driver to either remove his or her hands from the wheel or eyes from the road. Given the necessary processing requirements or voice recognition and limited space/cost constraints for vehicles, however, only a limited number of functions may be able to be controlled. In this case, the most accessed features (radio, CD, and climate control) are suitable candidates to provide voice recognition.

Other additional useful vehicle features may also be supplied such as a passive remote keyless entry system (RKE), engine immobilizer, or push button start, all of which are well known in the art.

In summary, cost of the vehicle is decreased due to the elimination of stalk switches, as is the overall clutter of electronics necessary to control the vehicle equipment, such as radio control head and HVAC control head. In addition, the safety of occupants of the vehicle is increased by the arrangement of multiple haptic controllers, menu keys, hotkeys, and switches appropriately located on and off the steering wheel. By judicious and logical design of the various controls, as well as display of the functions on the screen, the attention of the driver can be focused on the road rather than on equipment adjustment. The operator of the haptic controllers is able to change parameters of the vehicle equipment and their status on the display. Main functions have immediate access by using the designated hot-keys. The steering wheel controls also some redundant operations for radio and climate control and control non-redundant operations such as the turn signal, windshield wipers, cruise control, lights and system mute. The types of inputs that control vehicle functions include: a main haptic controller located on a console between the driver and front side passenger that is movable in the x, y, and z directions and rotatable, a mini-haptic controller located on the steering wheel that is rotatable and movable in the z direction, switches and menu keys located on the steering wheel and hotkeys located off the steering wheel. The outputs include an LCD or other comparable screen, tactile feedback, voice feedback redundancy, and the functional outputs (e.g. equipment outputs such as radio, climate control (HVAC), CD, wipers, turn signals, etc . . . ).

While particular embodiments of the present invention has been shown and described, modifications may be made. It is therefore intended in the appended claims to cover such changes and modifications which follow in the true spirit and scope of the invention.

What is claimed is:

1. A dual haptic control system comprising:
   a first haptic controller disposed on a steering wheel of a vehicle;
   a second haptic controller disposed on a console separated from the steering wheel; and
   device that, when a particular screen is accessed, permits control of a most often used function directly from the particular screen.

2. The dual haptic control system of claim 1, wherein the first haptic controller and the second haptic controller control overlapping functions of the vehicle.

3. The dual haptic control system of claim 1, wherein the first haptic controller is a mini-haptic controller that controls fewer functions of the vehicle than the second haptic controller control.

4. The dual haptic control system of claim 1, wherein the first haptic controller comprises a haptic wheel interface having functions selected through rotation and activated through depressing the wheel interface.

5. The dual haptic control system of claim 1, further comprising menu keys on the steering wheel that direct control of the first haptic controller to a desired function to be controlled.

6. The dual haptic control system of claim 5, further comprising hotkeys adjacent to the second haptic controller that direct control of different functions to be controlled than the menu keys.

7. The dual haptic control system of claim 6, further comprising switches disposed on the steering wheel, the switches controlling functions of the vehicle not controlled by either of the first and second haptic controllers.

8. The dual haptic control system of claim 7, wherein the switches are arranged such that groups of switches controlling related functions are grouped together.

9. The dual haptic control system of claim 1, further comprising a voice redundancy mechanism that provides voice redundancy for limited functions controlled by the first and second haptic controllers.

10. The dual haptic control system of claim 1, wherein only a portion of the steering wheel related to the first haptic controller provides tactile feedback.

11. The dual haptic control system of claim 1, further comprising a display that displays results of interaction between an operator and either of the first and second haptic controllers, wherein the display displays interaction options between the operator and the second haptic controller as simulated mechanical controls of functions available to the operator in a present state of the haptic control system and operations of the second haptic controller to control the functions available to the operator in the present state.

12. The dual haptic control system of claim 11, wherein the simulated mechanical controls are buttons and an operation to control one of a particular function and a sub-function of a particular button available to the operator is disposed within the particular button.

13. The dual haptic control system of claim 12, wherein information of settings of functions of the haptic control system other than the functions available in the present state are displayed outside the buttons.

14. The dual haptic control system of claim 13, wherein the buttons contain both text and graphics, the text indicating the particular function of the particular button and the graphics illustrating one of an appropriate symbol indicating the particular function of the particular button, sub-functions of the particular function, and the operation to control the one of the particular function and sub-function.

15. The dual haptic control system of claim 14, wherein the tactile feedback is provided for operation of the second haptic controller consistent with the operation to control the one of the particular function and sub-function of the particular button when the particular button has been selected by the operator.

16. The dual haptic control system of claim 1, further comprising a steering column devoid of stalk switches.

17. A method of controlling functions of a vehicle comprising:
   controlling a first set of the functions of the vehicle through haptic control on a steering wheel of the vehicle;
   controlling a second set of the functions of the vehicle through separate haptic control on a console of the vehicle; and
   when a particular screen is accessed, allowing control of a most often used function directly from the particular screen.

18. The method of claim 17, further comprising establishing redundant control of some of the same functions between the haptic controls on the steering wheel and the console.

19. The method of claim 17, further comprising limiting the first set of functions to fewer functions than the second set of functions, the haptic control on the steering wheel movable in a smaller number of directions than the haptic control on the console.

20. The method of claim 19, further comprising duplicating all of the first set of functions in the second set of functions.

21. The method of claim 17, further comprising directly accessing control of a desired function to be controlled of the first set of functions through menu keys on the steering wheel.

22. The method of claim 21, further comprising directly accessing control of a desired function to be controlled of the second set of functions through hotkeys that are proximate to the console.

23. The method of claim 22, further comprising displaying results of use of any of the haptic controls, the menu keys and the hotkeys.

24. The method of claim 17, further comprising controlling functions of the vehicle uncontrolled by any of the haptic controllers through switches and menu keys arranged on the steering wheel in a logically consistent format such that groups of switches and groups of menu keys each having related functions are grouped together.

25. The method of claim 17, further comprising receiving vocal redundancy when one of accessing and controlling limited functions controlled by the haptic controls.

26. The method of claim 17, further comprising, when controlling the first set of functions through the haptic control on the steering wheel, receiving tactile feedback on the steering wheel only from a portion of the steering wheel containing the haptic control on the steering wheel.

27. The method of claim 17, further comprising displaying interaction options between an operator and the separate haptic control as simulated mechanical controls of functions available to the operator in a present state and operations of the separate haptic control to control the functions available to the operator in the present state.

28. The method of claim 27, further comprising displaying the simulated mechanical controls as buttons that each contain an operation to control one of a particular function and a sub-function of the button available to the operator.

29. The method of claim 28, further comprising including both text and graphics in each button, the text indicating the particular function of the button and the graphics illustrating one of an appropriate symbol indicating the particular function of the button, sub-functions of the particular function, and the operation to control the one of the particular function and sub-function.

30. The method of claim 29, further comprising receiving tactile feedback for operation of the separate haptic control consistent with operation to control the one of the particular function and sub-function of the button when the button has been selected by the operator.

31. The method of claim 27, further comprising displaying information of settings of functions other than the functions available in the present state displayed outside the buttons.

32. The method of claim 17, further comprising eliminating stalk switches on a steering column of the vehicle.

33. A method of supplying vehicle information for a vehicle on different screens, the method comprising:
grouping the vehicle information into different systems of the vehicle;
providing different sets of adjustable functions for the different systems;
displaying each set of adjustable functions for a particular system on a representative screen for displaying the adjustable functions of a presently selected system, and pictorially representing the adjustable functions, pictorial representations of the adjustable functions containing one of interactive graphics and an interactive alphanumerical display that correspond to present states of the adjustable functions;
selecting an adjustable function of the vehicle through manipulation of a haptic controller in the vehicle;
controlling a present state of the selected adjustable function through manipulation of the haptic controller;
indicating the present state of the controlled adjustable function on the representative screen displaying the presently selected system; and
when a particular screen is accessed, allowing control of a most often used function directly from the particular screen.

34. The method of claim 33, further comprising incorporating textual information with the pictorial representations, the textual information supplied with each adjustable function indicating a name of the adjustable function.

35. The method of claim 33, further comprising displaying the adjustable functions as buttons and incorporating the pictorial representations in the buttons.

36. The method of claim 35, further comprising displaying available sub-functions of each adjustable function in the button corresponding to the adjustable function that include the available sub-functions.

37. The method of claim 36, further comprising displaying, in the button corresponding to the adjustable function, a method of controlling one of the adjustable function and a presently selected available sub-function of the adjustable function using the haptic controller.

38. The method of claim 36, further comprising displaying, in the button corresponding to the adjustable function, textual information indicating the present state of the adjustable function.

39. The method of claim 36, further comprising highlighting a presently selected sub-function.

40. The method of claim 35, further comprising outlining a presently selected button.

41. The method of claim 35, further comprising displaying, outside the buttons, information other than that of the presently selected system.

42. The method of claim 33, further comprising supplying one of tactile and voice feedback to an operator of the haptic controller that indicates one of when a screen is entered and when one of a function and sub-function displayed is selected, when the one of the screen is entered and the one of the function and sub-function displayed is selected.

43. A system that provides vehicle information to an occupant of a vehicle, the system comprising:
electronic components including a processor, memory, and video display circuitry, the processor grouping the vehicle information into different systems of the vehicle that have sets of adjustable functions;
a display having a screen, the processor controlling the display to display each set of the adjustable functions for a particular system on a representative screen that displays the adjustable functions of a presently selected system and to supply pictorial representations of the adjustable functions, the pictorial representations containing one of interactive graphics and an interactive alphanumerical display that correspond to present states of the adjustable functions, the representative screens and pictorial representations stored in the memory, and when a particular screen is accessed the processor also allowing control of a most often used function directly from the particular screen; and
inputs through which the adjustable functions are adjusted, the inputs including a haptic controller manipulated to select one of the adjustable functions and control a present state of the selected adjustable function,
wherein the electronic components receive signals from the inputs and transmit signals to the display indicating the present state of the controlled adjustable function on the representative screen displaying the presently selected system.

44. The system of claim 43, wherein the processor controls the display to incorporate textual information with the pictorial representations, the textual information supplied with each adjustable function indicating a name of the adjustable function.

45. The system of claim 43, wherein the processor controls the display to display the adjustable functions as buttons and incorporating the pictorial representations in the buttons.

46. The system of claim 45, wherein the processor controls the display to display available sub-functions of each adjustable function in the button corresponding to the adjustable function that include the available sub-functions.

47. The system of claim 46, wherein the processor controls the display to display, in the button corresponding to the adjustable function, a system of controlling one of the adjustable function and a presently selected available sub-function of the adjustable function using the haptic controller.

48. The system of claim 46, wherein the processor controls the display to display, in the button corresponding to the adjustable function, textual information indicating the present state of the adjustable function.

49. The system of claim 46, wherein the processor controls the display to highlight a presently selected sub-function.

50. The system of claim 45, wherein the processor controls the display to outline a presently selected button.

51. The system of claim 45, wherein the processor controls the display to display, outside the buttons, information other than that of the presently selected system.

52. The system of claim 43, further comprising an audio system controlled by the processor, wherein the processor controls signals to supply one of tactile and voice feedback to an operator of the haptic controller that indicates one of when a screen is entered and when one of a function and sub-function displayed is selected, when the one of the screen is entered and the one of the function and sub-function displayed is selected.

53. A dual haptic control system comprising:
 a first haptic controller disposed on a steering wheel of a vehicle;
 a plurality of other controls disposed on the steering wheel;
 a second haptic controller disposed on a console separated from the steering wheel; and
 a device that, when a particular screen is accessed, permits control of a most often used function directly from the particular screen
 wherein the first haptic controller and the second haptic controller control overlapping functions of the vehicle.

54. The dual haptic control system of claim 53, wherein only limited functions controllable by the second haptic controller are controllable by the first haptic controller.

55. The dual haptic control system of claim 54, wherein no functionality overlap exists between the other controls on the steering wheel and the second haptic controller.

56. The dual haptic control system of claim 53, wherein every function controllable by the first haptic controller is also controllable by the second haptic controller.

57. The dual haptic control system of claim 53, wherein no functionality overlap exists between the other controls and the first haptic controller.

* * * * *

UNITED STATES PATENT AND TRADEMARK OFFICE
CERTIFICATE OF CORRECTION

| | | |
|---|---|---|
| PATENT NO. | : 6,961,644 B2 | Page 1 of 1 |
| APPLICATION NO. | : 10/319435 | |
| DATED | : November 1, 2005 | |
| INVENTOR(S) | : Vincent Mercier et al. | |

It is certified that error appears in the above-identified patent and that said Letters Patent is hereby corrected as shown below:

In the Claims

Column 21, line 7, before "device that, when" insert --a--.

Signed and Sealed this

First Day of August, 2006

JON W. DUDAS
*Director of the United States Patent and Trademark Office*